US012638947B2

(12) United States Patent (10) Patent No.: US 12,638,947 B2
Bates (45) Date of Patent: May 26, 2026

(54) ORGANIC RESPONSIVE USER INTERFACE SYSTEM AND METHOD OF USE

(71) Applicant: Jeremy Bates, Kensington, MD (US)

(72) Inventor: Jeremy Bates, Kensington, MD (US)

( * ) Notice: Subject to any disclaimer, the term of this patent is extended or adjusted under 35 U.S.C. 154(b) by 0 days.

(21) Appl. No.: 18/751,102

(22) Filed: Jun. 21, 2024

(65) Prior Publication Data

US 2024/0427467 A1 Dec. 26, 2024

Related U.S. Application Data

(60) Provisional application No. 63/522,684, filed on Jun. 22, 2023.

(51) Int. Cl.
*G06F 3/044* (2006.01)
*G06F 3/01* (2006.01)
*G06F 3/041* (2006.01)

(52) U.S. Cl.
CPC ............ *G06F 3/0448* (2019.05); *G06F 3/016* (2013.01); *G06F 3/04162* (2019.05); *G06F 3/0418* (2013.01); *G06F 3/0447* (2019.05)

(58) Field of Classification Search
CPC .. G06F 3/0448; G06F 3/04162; G06F 3/0447; G06F 3/016; G06F 3/0418
See application file for complete search history.

(56) References Cited

U.S. PATENT DOCUMENTS 7,056,455 B2 6/2006 Matyjaszewski et al.
8,717,326 B2 5/2014 Ciesla
(Continued)

FOREIGN PATENT DOCUMENTS

CN 109213302 A 1/2009
CN 110069168 B 9/2022
(Continued)

OTHER PUBLICATIONS

Stephenson, C., and A. Hubler. "Stability and conductivity of self assembled wires in a transverse electric field." Scientific reports 5.1 (2015): 1-9. https://link.springer.com/content/pdf/10.1038/srep15044. pdf.

(Continued)

*Primary Examiner* — Lisa S Landis
(74) *Attorney, Agent, or Firm* — White-Welker & Welker, LLC; Matthew T. Welker, Esq.

(57) ABSTRACT

An organic interface converting data into tangible 3D shapes using programmable materials. It includes an interaction point with multiple surfaces and a projection module, all coordinated by a computing device for data transmission and reception. Data streams carry computer-readable code interpreted by the projection module to reorient surfaces, thereby materializing the data in three-dimensional space. The interface allows tactile input via human touch generating electrical currents that alter surface properties like position and smoothness. It also responds to audible frequencies and can receive data from secondary computing devices. Using a computing device, users can create 3D objects through data transmission to these responsive surfaces. The interface supports user interactions through touch, voice commands, and digital inputs from devices such as smartphones or tablets. Users have the flexibility to adjust the interface's resolution and response rate to tailor their interaction experience.

10 Claims, 20 Drawing Sheets

(56) References Cited

U.S. PATENT DOCUMENTS

| | | | |
|---|---|---|---|
| 8,836,643 | B2 | 9/2014 | Romera Joliff et al. |
| 9,619,032 | B1 | 4/2017 | Ekambaram et al. |
| 9,916,008 | B2 | 3/2018 | Bostick et al. |
| 9,927,786 | B2 | 3/2018 | Dewitte |
| 10,311,992 | B2 | 6/2019 | Engel-Herbert |
| 10,345,905 | B2 | 7/2019 | McClure et al. |
| 10,583,067 | B2 | 3/2020 | Kline et al. |
| 11,232,759 | B2 | 1/2022 | Kwon et al. |
| 11,397,956 | B1 | 7/2022 | Eidam et al. |
| 2009/0128503 | A1 | 5/2009 | Grant et al. |
| 2011/0304550 | A1* | 12/2011 | Romera Jolliff ........ G06F 3/016 715/810 |
| 2016/0293119 | A1* | 10/2016 | Kwon ................... G02F 1/0147 |

FOREIGN PATENT DOCUMENTS

| | | |
|---|---|---|
| GB | 2587368 A | 3/2021 |
| KR | 101561718 B1 | 10/2015 |
| KR | 20170092610 A | 7/2018 |
| WO | WO2015077728 A1 | 5/2015 |

OTHER PUBLICATIONS

Lee, S.; Her, I.; Jung, W.; Hwang, Y. Snakeskin-Inspired 3D Printable Soft Robot Composed of Multi-Modular Vacuum-Powered Actuators. Actuators 2023, 12, 62. https://doi.org/10.3390/act12020062.

Bobnar, M., Derets, N., Umerova, S. et al. Polymer-dispersed liquid crystal elastomers as moldable shape-programmable material. Nat Commun 14, 764 (2023). https://doi.org/10.1038/s41467-023-36426-y ; https://www.nature.com/articles/s41467-023-36426-y. Footnote 1 from: https://www.ncbi.nlm.nih.gov/pmc/articles/PMC8554782/.

Lan Luo, Fenghua Zhang, Yanju Liu, Jinsong Leng. Super-tough, self-sensing and shape-programmable polymers via topological structure crosslinking networks. Chemical Engineering Journal, vol. 457, 2023, 141282, ISSN 1385-8947, https://doi.org/10.1016/j.cej.2023.141282 ; (https://www.sciencedirect.com/science/article/pii/S138589472300013X).

Kaili Wang, Youming Dong, Zhe Ling, Xiaorong Liu, Sheldon Q. Shi, Jianzhang Li. Transparent wood developed by introducing epoxy vitrimers into a delignified wood template, Composites Science and Technology, vol. 207, 2021, 108690, ISSN 0266-3538, https://doi.org/10.1016/j.compscitech.2021.108690.

Tingzi Yan, Xianlu Li, Huihui Xu, Yongjin Li. Vitrimer-like transparent blend films based on reactive blending of PC and PMMA with catalysis of Mg(TFSI)2, Composites Communications, vol. 36, 2022, 101394, ISSN 2452-2139, https://doi.org/10.1016/j.coco.2022.101394.

Preparation of Colorless, Highly Transparent, Epoxy-Based Vitrimers by the Thiol-Epoxy Click Reaction and Evaluation of Their Shape-Memory Properties. Mikihiro Hayashi, Akira Katayama. CS Appl. Polym. Mater. 2020, 2, 6, 2452-2457. May 21, 2020, https://doi.org/10.1021/acsapm.0c00397.

http://hyperphysics.phy-astr.gsu.edu/hbase/vision/specol.html.

Electroactive Soft Actuators Based on Columnar Ionic Liquid Crystal/Polymer Composite Membrane Electrolytes Forming 3D Continuous Ionic Channels Siyu Cao, Junko Aimi, and Masafumi Yoshio ACS Applied Materials & Interfaces 2022 14 (38), 43701-43710 DOI: 10.1021/acsami.2c11029.

https://www.sciencedirect.com/science/article/pii/S1878535221004858#bb0035.

https://www.semanticscholar.org/paper/Self-assembly-of-semiconductor-nanocrystals-into-Shevchenko-Talapin/cb448a9432c88800363a3182a20962373df54efa.

Liu, J., Wen, Z., Lei, H et al. A Liquid-Solid Interface-Based Triboelectric Tactile Sensor with Ultrahigh Sensitivity of 21.48 kPa-1. Nano-Micro Lett. 14, 88 (2022). https://doi.org/10.1007/s40820-022-00831-7. https://link.springer.com/article/10.1007/s40820-022-00831-7.

An Ultra-Shapeable, Smart Sensing Platform Based on a Multimodal Ferrofluid-Infused Surface Abdelsalam Ahmed, Islam Hassan, Islam M. Mosa, Esraa Elsanadidy, Mohamed Sharafeldin, James F. Rusling, Shenqiang Ren. First published: Jan. 28, 2019 https://doi.org/10.1002/adma.201807201 ; https://onlinelibrary.wiley.com/doi/abs/10.1002/adma.201807201.

https://www.researchgate.net/publication/334619840_Self_Assembly_of_Ultrathin_Nanocrystals_to_Multidimensional_Superstructures.

Long, Y.; Hui, J.- f.; Wang, P.-p.; Hu, S.; Xu, B.; Xiang, G.-I.; Zhuang, J.; Lü, X.-q.; Wang, X. α-MnO2 nanowires as building blocks for the construction of 3D macro-assemblies. Chem. Commun. 2012, 48, 5925-5927.

Wang, K.; Lin, H.; Ni, B.; Li, H.; Sial, M. A. Z. G.; Yang, H.; Zhuang, J.; Wang, X. Three-dimensional macroscale assembly of Pd nanoclusters. Nano Res. 2018, 11, 3175-3181.

https://www.sciencedirect.com/science/article/pii/S1878535221004858.

https://www.sciencedirect.com/science/article/abs/pii/S2211285518307043.

https://www.nature.com/articles/s41563-018-0246-7.

https://www.tandfonline.com/doi/full/10.1080/14686996.2020.1777833.

https://www.neowin.net/news/guide-to-smartphone-hardware-47-displays/.

https://electronics.howstuffworks.com/lcd.htm.

https://www.researchgate.net/figure/MRI-3D-printing-data-and-photographs-of-three-patients-A-E-I-MRI-images-of-two_fig1_349833784.

https://theconversation.com/we-created-holograms-you-can-touch-you-could-soon-shake-a-virtual-colleagues-hand-167478.

Pseudo-Hologram with Aerohaptic Feedback for Interactive Volumetric Displays: https://onlinelibrary.wiley.com/doi/10.1002/aisy.202100090.

"Mechanical properties of magnetorheological fluids under squeeze-shear mode" by Wang, Hong-yun; Zheng, Hui-qiang; Li, Yong-xian; Lu, Shuang.

Algorithmic lattice kirigami: A route to pluripotent materials. Daniel M. Sussman, Yigil Cho, Toen Castle, +3, and Randall D. Kamien https://www.pnas.org/doi/10.1073/pnas.1506048112.

https://www.sciencedirect.com/topics/materials-science/shape-memory#:~:text=SMMs%20are%20classified%20into%20groups,(SMHs)%20%5B13%5D.

https://www.psu.edu/news/research/story/transparent-metal-films-smartphone-tablet-and-tv-displays/.

https://onlinelibrary.wiley.com/doi/abs/10.1002/adma.201804602.

https://www.biolinscientific.com/blog/what-are-surfactants-and-how-do-they-work.

Akpan IJ, Shanker M. A comparative evaluation of the effectiveness of virtual reality, 3D visualization and 2D visual interactive simulation: an exploratory meta-analysis. Simulation. 2019;95(2):145-170. doi:10.1177/0037549718757039; https://www.rtinsights.com/why-true-3d-visualizations-are-replacing-2d-and-static-3d/; http://blogs.evergreen.edu/vistas/files/2015/02/dubel-topost-2dvs3d-visieeevis2014_submission_3.pdf.

3D-Printed Heart Helps Surgeons Plan Complex Surgery (clevelandclinic.org).

How 3D Printer Heart Technology Changed a Teen's Life | UC San Francisco (ucsf.edu).

https://pubs.acs.org/doi/10.1021/acsami.2c02690.

https://www.researchgate.net/publication/335371607_Ionic_liquid-based_click-ionogels.

https://www.mdpi.com/2227-9040/9/8/201.

https://core.ac.uk/download/pdf/211274048.pdf.

https://asmedigitalcollection.asme.org/appliedmechanics/article/88/3/031016/1091751/All-Solid-Ionic-Eye.

https://doi.org/10.1038/s41563-022-01195-4.

https://arrow.tudublin.ie/cgi/viewcontent.cgi?article=1015&context=scschcpscon.

https://www.academia.edu/en/27395182/A_Smartphone_Controlled_Handheld_Microfluidic_Liquid_Handling_System_Supplement.

https://www.semanticscholar.org/paper/Self-Excited-Vibration-Valve-That-Induces-Traveling-Miyaki-Tsukagoshi/e9ab9be84e7e22c3d0ae1ebd8a7237a16b5300f5.

(56)        References Cited

OTHER PUBLICATIONS https://www.researchgate.net/publication/270933205_Stretchable_cell_culture_platforms_using_micropneumatic_actuators.
https://www.sciencedirect.com/science/article/abs/pii/S0924424702001413.
E. Shevchenko, et al., https://www.semanticscholar.org/paper/Self-assembly-of-semiconductor-nanocrystals-into-Shevchenko-Talapin/cb448a9432c88800363a3182a20962373df54efa.
A.V. Agafonov, et al., https://www.sciencedirect.com/science/article/pii/S1878535221004858#bb0035.
Xun Wang, https://www.researchgate.net/publication/334619840_Self_Assembly_of_Ultrathin_Nanocrystals_to_Multidimensional_Superstructures.
Rafida Sahrash, et al. https://www.sciencedirect.com/science/article/pii/S2405844018323272#fig1.
Too Chen, et al., https://www.sciencedirect.com/science/article/abs/pii/S2211285518307043.
Chris Leighton, https://www.nature.com/articles/s41563-018-0246-7.
Ryota Tamate, https://www.tandfonline.com/doi/full/10.1080/14686996.2020.1777833.
Tim Schiesser, https://www.neowin.net/news/guide-to-smartphone-hardware-47-displays/.
Jeff Tyson, https://electronics.howstuffworks.com/lcd.htm.
"poly(vinylene fluoride) (CHEBI:53250)". Retrieved Jul. 14, 2012.
Zhang, Q. M., Bharti, V., Kavarnos, G., Schwartz, M. (Ed.), (2002). "Poly (Vinylidene Fluoride) (PVDF) and its Copolymers", Encyclopedia of Smart Materials, vols. 1-2, John Wiley & Sons, 807-825.
"PVDF (Polyvinylidene fluoride, Tecaflon®, Solef®, Kynar®) | Plastics International".
Kawai, Heiji (1969). "The Piezoelectricity of Poly (vinylidene Fluoride)". Japanese Journal of Applied Physics. 8 (7): 975-976. Bibcode:1969JaJAP . . .8 . . 975K. doi:10.1143/JJAP.8.975.
Lolla, Dinesh; Lolla, Manideep; Abutaleb, Ahmed; Shin, Hyeon U.; Reneker, Darrell H.; Chase, George G. (Aug. 9, 2016). "Fabrication, Polarization of Electrospun Polyvinylidene Fluoride Electret Fibers and Effect on Capturing Nanoscale Solid Aerosols". Materials. 9 (8): 671. Bibcode:2016Mate....9..671L. doi:10.3390/ma9080671. PMC 5510728. PMI.
"Physical and Mechanical Properties". Arkema, Inc. Innovative Chemistry.
Jump up to:a b "PVDF Performance & Characteristics Data" (PDF). Plastic Pipe Solutions.
Prevedouros K., Cousins I. T., Buck R. C., Korzeniowski S. H. (Jan. 2006). "Sources, fate and transport of perfluorocarboxylates". Environ. Sci. Technol. 40 (1): 32-44. Bibcode:2006EnST . . . 40...32P. doi:10.1021/es0512475. PMID 16433330.
Zhang, Qiwu; Lu, Jinfeng; Saito, Fumio; Baron, Michel (2001). "Mechanochemical solid-phase reaction between polyvinylidene fluoride and sodium hydroxide" (PDF). Journal of Applied Polymer Science. 81 (9): 2249. doi:10.1002/app.1663.

Ordoñez, J.; Gago, E. J.; Girard, A. (Jul. 1, 2016). "Processes and technologies for the recycling and recovery of spent lithium-ion batteries". Renewable and Sustainable Energy Reviews. 60: 195-205. doi:10.1016/j.rser.2015.12.363. ISSN 1364-0321.
Guzman, E.; Cugnoni, J.; Gmür, T. (2013). "Survivability of integrated PVDF film sensors to accelerated ageing conditions in aeronautical/aerospace structures". Smart Mater. Struct. 22 (6): 065020. Bibcode:2013SMaS . . . 22f5020G. doi:10.1088/0964-1726/22/6/065020.
Omote, Kenji; Ohigashi, Hiroji; Koga, Keiko (1997). "Temperature dependence of elastic, dielectric, and piezoelectric properties of "single crystalline" films of vinylidene fluoride trifluoroethylene copolymer". Journal of Applied Physics. 81 (6): 2760. Bibcode: 1997JAP....81.2760O. doi:10.1063/1.364300.
Nix, E. L.; Ward, I. M. (1986). "The measurement of the shear piezoelectric coefficients of polyvinylidene fluoride". Ferroelectrics. 67: 137-141. doi:10.1080/00150198608245016.
Bao, Hui-Min; Song, Jiao-Fan; Zhang, Juan; Shen, Qun-Dong; Yang, Chang-Zheng; Zhang, Q. M. (Apr. 3, 2007). "Phase Transitions and Ferroelectric Relaxor Behavior in P(VDF-TrFE-CFE) Terpolymers". Macromolecules. ACS Publications. 40 (7): 2371-2379. Bibcode:2007MaMol..40.2371B. doi:10.1021/ma062800I.
Ahmed, Saad; Arrojado, Erika; Sigamani, Nirmal; Ounaies, Zoubeida (May 14, 2015). Goulbourne, Nakhiah C. (ed.). "Electric field responsive origami structures using electrostriction-based active materials". Proceedings of SPIE: Behavior and Mechanics of Multifunctional Materials and Composites 2015. Behavior and Mechanics of Multifunctional Materials and Composites 2015.
Wang, M., Zhang, P., Shamsi, M. et al. Tough and stretchable ionogels by in situ phase separation. Nat. Mater. 21, 359-365 (2022), https://doi.org/10.1038/s41563-022-01195-4.
https://www.ncbi.nlm.nih.gov/pmc/articles/PMC8284813/.
https://nypost.com/2023/02/27/chinese-kissing-app-with-real-life-silicon-lips-panned-as-creepy/.
https://www.intechopen.com/chapters/72010.
Hierarchical Self-Assembly of Cellulose Nanocrystals in a Confined Geometry. Richard M. Parker, Bruno Frka-Petesic, Giulia Guidetti, Gen Kamita, Gioele Consani, Chris Abell, and Silvia Vignolini. ACS Nano 2016 10 (9), 8443-8449. DOI: 10.1021/acsnano.6b03355. https://pubs.acs.org/doi/10.1021/acsnano.6b03355.
https://onlinelibrary.wiley.com/doi/full/10.1002/pat.5652.
Self-Assembly of Colloidal Nanocrystals: From Intricate Structures to Functional Materials. Michael A. Boles, Michael Engel, and Dmitri V. Talapin. Cite this: Chem. Rev. 2016, 116, 18, 11220-11289. Aug. 23, 2016 https://doi.org/10.1021/acs.chemrev.6b00196.
Pan Jiang, Peng Lin, Chang Yang, Hongling Qin, Xiaolong Wang, and Feng Zhou. 3D Printing of Dual-Physical Cross-linking Hydrogel with Ultrahigh Strength and Toughness. Chemistry of Materials 2020 32 (23), 9983-9995 DOI: 10.1021/acs.chemmater.0c02941.

* cited by examiner

Dielectric Elastomer

Polyvinylidene fluoride (PVDF)

doped PVDF

ORGANIC RESPONSIVE USER INTERFACE SYSTEM AND METHOD OF USE

The present invention relates generally to information systems and more specifically to an organic responsive user interface system that converts data into a three-dimensional dynamic non-static object.

BACKGROUND OF THE PRESENT INVENTION

Common Information systems use computing devices and computer code or instruction to accomplish mathematical operations to effectuate a wide range of digital presentations. Common information systems include personal computing devices that have a computer, a monitor or display, a mouse, a keyboard, and perhaps other peripheral devices. The computer runs a set of instructions known as an operating system the allows all of these parts to work together.

For example, a computer is configured so that its operating system runs a web browser program when activated. In this example, a person would view the web browser program to access information and entertainment from any of the available sites on the world wide web. Commands and direction are provided by the person to the web browser program through the keyboard and the mouse. The information provided by the site is displayed on the monitor. This interaction continues indefinitely until the person ceases to provide input or the site ceases to provide data for the display.

Other types of interactions exist where a person provides input and receives information in return. Most commonly this information is received visually through monitors, displays, televisions, and such.

The prior art describes a method to present an image on a display device where the image is divided into multiple portions that are created through the manipulation of liquid crystals.

Another development in the information systems area is a display which is associated with a processor that reads and actuates instructions to show content on the display and receive input from a person through contact with the display. This is commonly referred to as touch screen input.

One of the problems associated with common information systems is their limited efficiency. For example, the input to the computing device is received through keyboards, mice, our touch screen contact. These input methods are limited to the two-dimensional images shown on a display. The user is not able to interact visually or physically with the images or data available through the computer or any other display type system. With limited interactions and display of information the user must make the best of the two-dimensional representations that are available that causes work arounds and less than optimal results.

While developments have been made in the area of common information systems, the room exists for further improvement.

SUMMARY OF THE PRESENT INVENTION

The described invention is an organic responsive interface that translates data into tangible 3D shapes using deformable media (i.e. programmable material). This system features at least one interaction point equipped with multiple surfaces and a projection module. These components work together with a computing device that transmits and receives data streams. The data streams contain computer-readable code interpreted by the projection module, which then communicates with the surfaces to reorient them, creating the data stream's content in three-dimensional real space. Various materials and methods are proposed.

The interface allows for tactile input through an interaction point where human skin contact generates an electrical current that modifies the surface's properties, such as position and smoothness. Additionally, these surfaces can respond to audible frequencies and receive data from secondary computing devices. The interface can create three-dimensional objects by utilizing a computing device that manages data transmission to the responsive surfaces. It also supports user interactions through touch and other input methods like voice commands or digital inputs from user devices such as smartphones or tablets. Users can adjust the resolution and response rate of the interface to customize their interaction experience.

Furthermore, the present invention incorporates optionally, artificial chromatophores and artificial melanophores (brown and black) as shown in FIG. 13, artificial melanocyte cells, artificial xanthophores (ranging from yellow to red are called), artificial erythrophore cells (red pigment), and nanostructured periodicity as shown in FIG. 13, enabling the shapeless media to not only form shapes but also reflect light to display colors based on the transmitted 3D data and objects. This feature enhances the visual and interactive experience by providing dynamic color changes that correspond to the generated shapes. Overall, the responsive interface offers a versatile and immersive way to manipulate and visualize data in three-dimensional space, making it suitable for various applications that require real-time physical interaction with digital content.

BRIEF DESCRIPTION OF THE DRAWINGS

The accompanying drawings, which are incorporated herein and form a part of the specification, illustrate the present invention and, together with the description, further serve to explain the principles of the present invention and to enable a person skilled in the pertinent art to make and use the present invention.

The figures include indicators that represent the same part or feature from one figure to another. The intent of the figures is to illustrate the concepts of the present invention and not to limit or restrict the scope of the disclosure.

DETAILED DESCRIPTION OF THE PRESENT INVENTION

The present invention is described herein to provide insight and knowledge of the idea and the benefits it provides. Aspects of the idea will provide additional benefit to those skilled in the art and should be respected as intellectual property of the inventor. While changes and modifications to the described idea are natural in the development process it is anticipated that these changes will not alter or diminish the scope of the present invention.

In the following detailed description of the present invention of exemplary embodiments of the present invention, reference is made to the accompanying drawings (where like numbers represent like elements), which form a part hereof, and in which is shown by way of illustration specific exemplary embodiments in which the present invention may be practiCED. These embodiments are described in sufficient detail to enable those skilled in the art to practice the present invention, but other embodiments may be utilized, and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the present invention. However, it is understood that the present invention may be practiced without these specific details. In other instances, well-known structures and techniques known to one of ordinary skill in the art have not been shown in detail in order not to obscure the present invention. Referring to the figures, it is possible to see the various major elements constituting the apparatus of the present invention.

Figure 6:
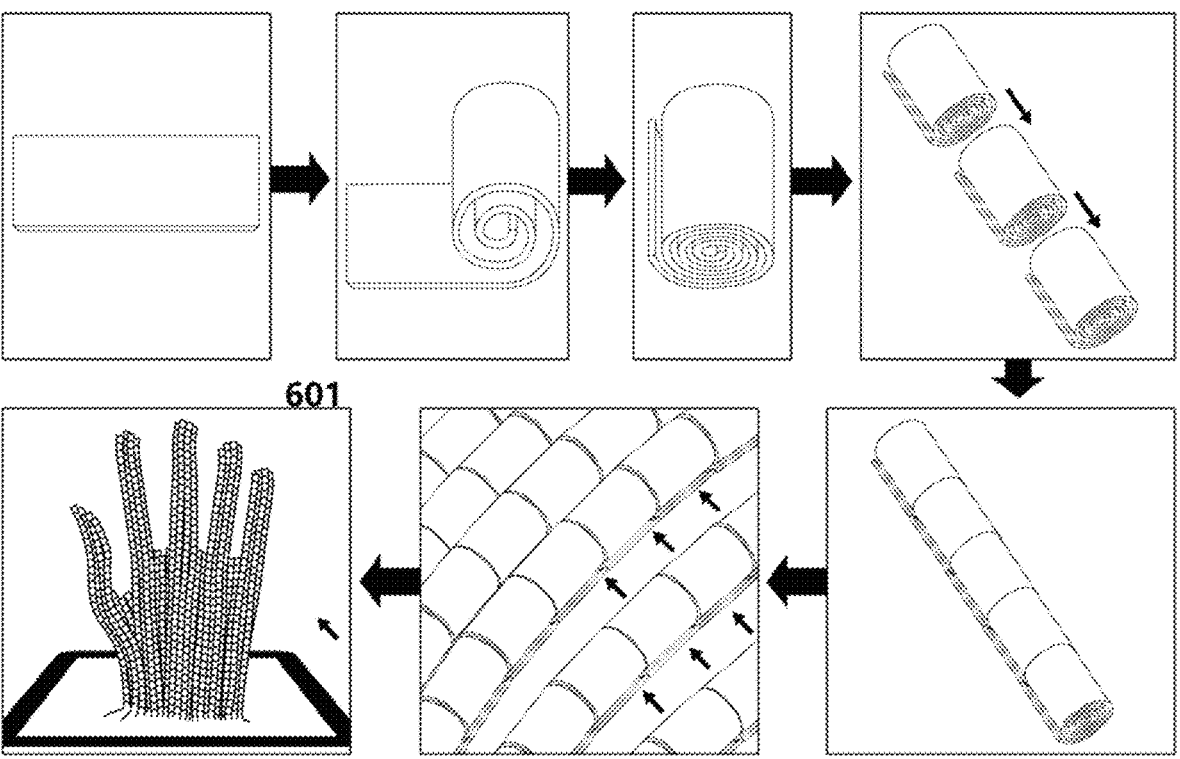
FIG. 6 is an example in addition to the example in FIG. 2, of the method by which physical shapes are created in a device-agnostic environment.

FIG. 6 in general and Image 601 in particular demonstrate the present invention taking a human hand. It should be noted that other shapes (a human face, shoes, a purse, graphs of data, representations of physical models of for example motorcycles, cars, houses, etc. are also achievable based on the 3D input data being converted to signal input the deformable media/device/invention conforms to in its activated state.

When in use, multiple devices (e.g. a laptop in one country and a laptop in another country) establish a connection via FaceTime, Zoom, etc. The streaming data (primarily video) may be transmitted in part or in whole to the present invention device.

Figure 5:
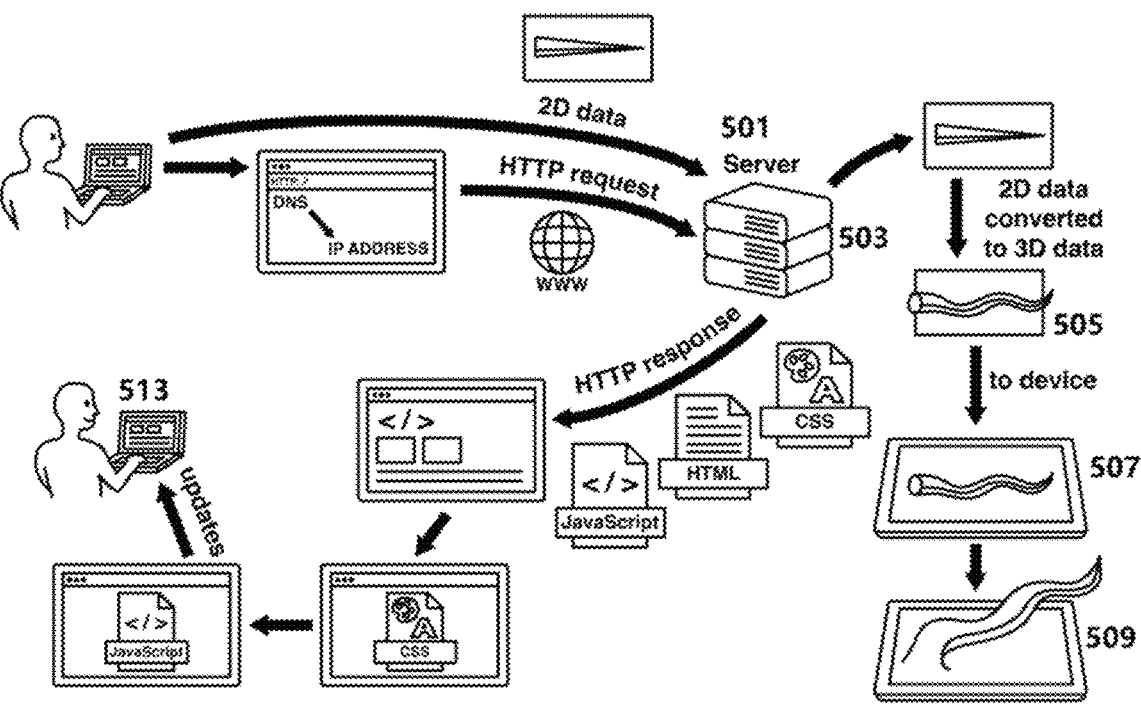
FIG. 5 is a flowchart of a method of forming a representation on an interaction point 103.

Wi-Fi servers, routers, and networks, i.e. a computing device's network sends a data stream containing information about a three-dimensional object to an interpretation point, which receives and processes the data. The interpretation point, equipped with a projection module, generates a representation of the object and projects it onto a physical structure, such as rectangular cylinders as shown in FIG. 5. This representation is then physically interacted with by a user, whose touches with their fingers or an electronic pen or digitally connected gloves alter the representation and transmit data back to the computing device. This interconnected system allows for real-time updates and changes to the representation, enabling the user to request new information, modify the shape and form of the object, and record changes made to the representation. The devices work in harmony, transferring and reflecting interactions between each other, creating a synchronized and immersive experience.

It is believed that the idea of this disclosure solves one or more problems associated with common information systems and displays. Namely, the present invention allows the display of three-dimensional data, imagery, and input from a user through transmission of data of any dimensionality, verbal/vocal stimulus, ultrasonic, hypersonic, and or physical interaction therewith. It is believed that benefits from the idea described herein are not limited to those that have been expressly described but will be understood by those skilled in the art of information systems and displays.

Figure 1:
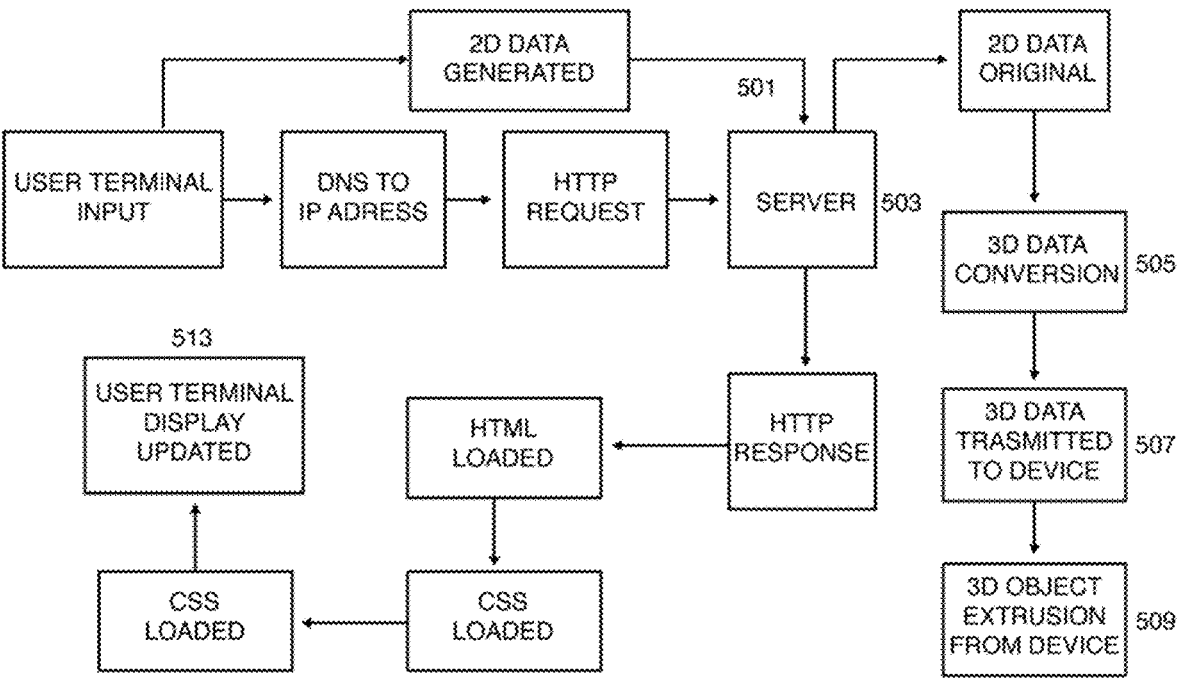
FIG. 1 is a flowchart of the preferred embodiment.

Referring now to the figures of the application the idea will be described in its detail components. It will be understood that numbers in the various figures are indicative of the same part or piece in multiple figures. FIG. 1 depicts a simplified schematic of a graphic responsive user interface system in its preferred embodiment. It will be understood that system 101 provides improvements over common information systems.

Discussion on general embodiment and broader ways of making the present invention:

Within the material science space of responsive materials, the following stand out:

Liquid crystal elastomers (LCEs) are a unique class of materials that bridge the gap between rubbery elasticity and liquid crystal order. They achieve this by combining slightly crosslinked polymer networks with liquid crystalline phases. LCEs can be categorized based on the arrangement of the liquid crystalline molecules (mesogens). In main-chain LCEs, the mesogens are directly incorporated into the polymer backbone, whereas in side-chain LCEs, they are linked via a spacer molecule. These properties make LCEs particularly attractive for applications requiring artificial muscles or microrobots due to their ability to convert external stimuli into movement. LCE's are able to change shape in response to temperature and light, can recover their original shape.

While Liquid Crystal Elastomers (LCEs) offer exciting potential for applications like artificial muscles and micro-robots, it is important to consider their limitations. Some high-performance thermoplastics (e.g. thermoplastic poly-urethanes (TPU), polyether ether ketones (PEEK), polyim-ides (PI), ultra-high molecular weight polyethylene (UHMWPE), etc.) and double network (e.g. polyelectrolyte complex (PEC), hydrogel double networks (e.g. polyacryl-amide (PAM) based double hydrogels, etc.), clay reinforced double networks, etc.) designs might be more suitable for situations demanding exceptional fatigue resistance. Differ-ent LCE types and their strengths and weaknesses include:

Side-chain LCEs: These LCEs have the mesogens (liquid crystal molecules) attached to the polymer backbone via a spacer molecule. This arrangement often leads to:

Weaker mechanical performance: The spacer molecule can introduce a point of weakness in the structure, limiting their overall strength.

Smaller contractions: The side-chain arrangement can restrict the movement of the mesogens, resulting in less significant shape changes upon stimulation.

Example: Siloxane-Based Side-Chain LCEs are a Common Type, Often Used in research due to their relative ease of synthesis Main-chain LCEs: In contrast to side-chain LCEs, the mesogens are directly incorporated into the polymer back-bone of main-chain LCEs. This offers several advantages:

Strong mechanical performance: The direct integration of mesogens leads to a more robust structure, enhancing their mechanical strength.

Large strain capabilities: The close coupling between the polymer and mesogens allows for significant shape changes when stimulated.

Example: Main-Chain LCEs Based on Norbornene are being Explored for their Potential Use in Artificial Muscles Due to their High Contractile Force Photothermal-driven LCEs: This type of LCE utilizes light as a trigger for actuation. Here is what sets them apart:

Advantages of accuracy and remote control *: Light allows for precise control over the actuation process, enabling targeted activation of specific LCE regions.

Requirement for photothermal material: These LCEs need to incorporate a light-absorbing material (photothermal material) to convert light energy into heat, which then triggers the shape change.

Example: Azo-dye-containing LCEs are a class of pho-tothermal LCEs where the azo dye acts as the photothermal material, inducing shape changes upon light absorption.

Self-Healing Polymers (SHP's) (e.g. epoxies, Polyure-thane, Poly bisphenol-A-co-epichlorohydrin, Polycaprolac-tone (PCL), Poly(methyl methacrylate) (PMMA), Poly(eth-ylene-co-methyl acrylate) (EMA), Poly(ethylene-co-methacrylic acid) (EMAA), Poly(ethylene glycidyl methacrylate) (EGMA), Diels-Alder (DA), retro-Diels-Al-der (RDA), Thiol-based polymers, Poly(urea-urethane), Diels-Alder and retro-Diels-Alder, etc.) offer exciting capa-bilities for self-repair. They can mend cracks and even change shape through self-healing processes. However, it is important to consider the trade-offs associated with these materials:

Strength vs. Healing: While strengthening the polymer chains can enhance mechanical performance, it can also hinder the self-healing ability.

Cost Considerations: Some SHPs require the use of expensive additives to facilitate self-healing, while others can be formulated with more affordable starting materials (monomers).

Figure 15:
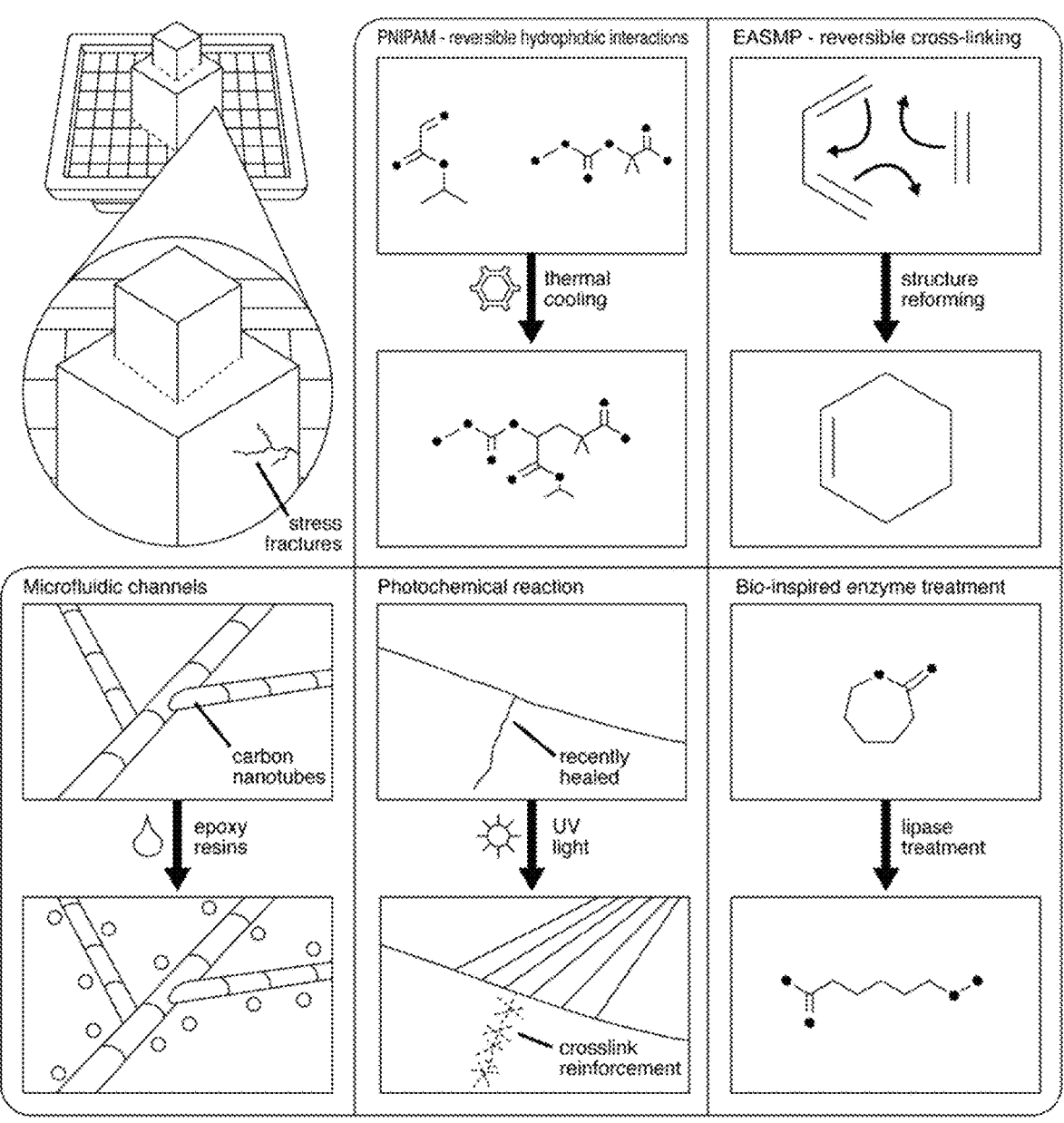
FIG. 15 is a presentation of a redundant healing process (RHP) which employs five different healing processes in response to stress and strain.

Limited Healing: The self-healing functionality in some SHPs might only work once or a limited number of times in the same location. This is offset by degrees, via the redun-dant healing process (FIG. 15).

Early Detection: Small cracks or imperfections can com-promise the material's performance if not detected or repaired promptly.

Temperature Dependence: Certain SHPs require specific temperature conditions to activate the self-healing process.

Durability Considerations: Overall, SHPs might not yet match the robustness of conventional materials in some aspects.

Performance at Extremes: Extreme temperatures can degrade the performance of some SHPs.

Dynamic Covalent Chemistries (DCCs) and Dynamic Covalent Products (DCP's) (e.g. Diels-Alder adducts, Dis-ulfides, Trithiocarbonates, Boronic acid esters, Carbene dimers, Multiarylethanes, and any other type of DCP obtained via Aldol reactions, (4+2) cycloadditions, Olefin and alkyne metathesis, Disulfide exchange, and Boronic acid condensation) offer a powerful approach to self-assembly at the molecular level. However, for successful implementa-tion, several factors need to be carefully considered:

Thermodynamic Stability vs. Reversibility: The bonds formed during DCC reactions (e.g., Diels-Alder cycloaddi-tions) must be thermodynamically stable enough to hold the structure together. Yet, these bonds must also be reversible to allow for dynamic rearrangement and self-healing prop-erties.

Functional Group Compatibility: Ideally, the DCC reac-tion should proceed under conditions that will not interfere with other functional groups present in the molecule. This ensures the overall integrity and functionality of the assembled structure.

Overcoming the Entropic Barrier: Self-assembly through DCCs needs to overcome the inherent tendency of systems to increase disorder (entropy). This can be achieved by ensuring all intermediate steps in the reaction are reversible.

For shape-shifting, optimum materials include: Reconfig-urable Polymer Networks (RPNs) (e.g Hydrogels, Cross-linked polymers, network polymers formed by weak con-nections (e.g. gel formed by pectin), C—N crosslinked polymer networks (e.g. linear poly(methyl methacrylate) (LPMMA), linear poly(methyl acrylate) (LPMA) with 2-phenylindole in the side chains, Polylactide (PLA)-based reversible/dynamic polymer networks, etc.) which possess a remarkable ability to form and break reversible cross-links. This allows them to change shape and even return to their original form, making them highly versatile materials. How-ever, these advantages come with some limitations:

Balancing Complexity and Functionality: Reversible pho-tocuring offers a more intricate approach to creating "smart materials" that can respond to external stimuli. However, this complexity comes at the cost of simplicity and speed compared to traditional non-reversible photocuring meth-ods.

Control vs. Advanced Materials: Reversible deactivation radical polymerization (RDRP) provides greater control over network homogeneity, enabling the creation of advanced materials with unique properties. On the other hand, this approach might limit the precise control over the growth and structure of individual polymer chains.

Stimuli-Responsive Shape Memory Polymer Networks (SMPNs) (e.g. (meth) acrylates, polyurethanes, blends of polyurethane and polyvinylchloride, linear block copolymers, and polyetheresters, etc.) offer a fascinating ability to change shape in response to light or temperature. SMPNs Able to change shape in response to temperature and light, and are able to recover their original shape through shape-memory effects with the tradeoffs of:

Strength and Recovery: While SMPNs exhibit shape-memory effects, they may have lower recovery stress compared to shape memory alloys (SMAs). This means they might exert less force when returning to their original shape. Additionally, SMPNs may have longer recovery times and a shorter overall lifespan compared to SMAs.

Brittle vs. Tear-Prone: Pure SMPNs can be quite brittle in their glassy state, making them susceptible to cracks. Conversely, in their rubbery state, they might tear easily along these micro-cracks when tensional forces are applied.

Material Properties: Compared to shape memory ceramics and metallic alloys, SMPNs generally exhibit lower thermal and electrical conductivity. They might also have weaker overall mechanical properties. Additionally, unlike some other shape-memory materials, SMPNs typically do not respond to electromagnetic stimuli.

Brittle in glassy state: Pure SMPs are brittle in their glassy state

Tear rapidly in rubbery state: Pure SMPs tear rapidly along micro-cracks formed under tension in their rubbery state.

Figure 14:
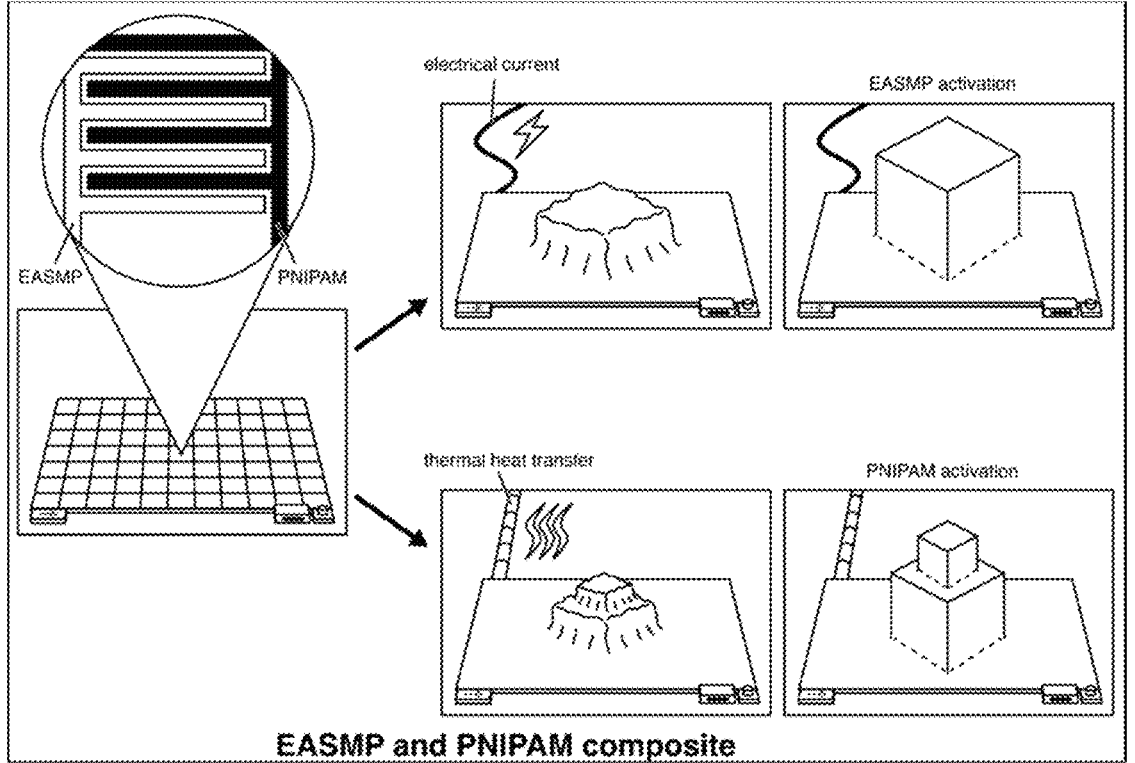
FIG. 14 is a presentation of an EASMP and PNIPAM Composite enablement manifesting basic geometries.

Shape memory alloys (SMAs) (e.g. Nickel-Titanium (NiTi) Alloy (e.g., EASMPs and PNIPAM as shown in FIG. 14, copper-based SMAs (e.g., Copper-aluminum-nickel (CuAlNi), etc.) are a class of metallic materials that can "remember" their original shape. They can be deformed into a temporary shape when exposed to stress or increased temperature. However, the key property of SMAs is their ability to return to their original programmed shape when cooled down below a certain transition temperature. This unique characteristic makes them valuable for a variety of applications. SMAs achieve their shape-memory effect through a process called martensitic transformation. The internal crystal structure of the alloy changes at specific temperatures, allowing for deformation. Cooling the material triggers a reverse transformation, restoring the original crystal structure and causing the SMA to return to its programmed shape. Like the other materials discussed, caveats and trade-offs of SMAs include:

Cooling Requirements: While some SMAs respond to body temperature, others require specialized cooling systems (like with freon or refrigerants) to reach their activation temperature. This can limit their use in certain applications.

Force and Speed: SMAs can exert significant force during shape recovery, but their speed might be slower compared to other actuation mechanisms.

Material Types:

Copper-based SMAs: These are generally cheaper and easier to work with, but they are more prone to brittleness and require careful handling during manufacturing.

NiTi SMAs: (Nickel-Titanium) These are the most common type and offer good overall performance. However, they can be slow to respond and consume more power when using self-heating for actuation.

Actuator Design: The design of an SMA actuator can influence its performance:

Bias Spring: This spring can affect the trade-off between available force and travel distance. A stronger spring increases travel distance but reduces force output.

Actuation Speed: While SMAs offer many advantages, their response speed can be slow. Techniques to reduce the time needed for the phase transition temperature can improve driving speed.

Despite these considerations, SMAs offer numerous benefits including but not limited to: high actuation stresses and strains, high power-to-weight ratio, compact structures, high reliability for many activation cycles.

Electroactive Polymers (EAPs) are polymers that change shape when an electric current is applied. This allows for the creation of flexible displays that can bend, curve, or even fold. However, there are some trade-offs to consider:

Ionic EAPs: These require low voltage but have a slow response and limited shape change. They function well in wet environments (e.g., hydrogels).

Dielectric EAPs: These offer a fast response and large deformations, but they only work in dry conditions (e.g. not optimum for hydrogel-employing applications) and require high voltage initially. They also consume minimal power once activated.

Challenges:

Repeatability: EAPs can experience issues with maintaining consistent shape changes over repeated cycles (hysteresis and Mullin's effect).

Performance Under Pressure: EAPs can struggle with changing conditions, including:

Frequency Response: The ability to respond effectively to rapidly changing electrical signals.

Viscoelastic Effects: A combination of elastic and viscous behavior that can lead to energy loss and slower response times.

Force Output: Currently, EAP actuators lack the force needed for many applications.

Stretchable electronics is a field focused on developing electronic components that can deform and elongate without breaking. This opens doors for highly flexible displays that can conform to curved surfaces or even be wrapped around objects. While they can function similarly to conventional circuit boards and even fold or unfold repeatedly, stretchable electronics come with some limitations:

Conductivity and Energy: Stretchable electronics, though resilient, often have lower conductivity and energy density compared to traditional electronics.

Balancing Stretch and Performance: Incorporating conductive nanoparticles into stretchable polymers to achieve conductivity can sometimes limit their practical applications due to trade-offs with other properties.

Fabrication Challenges: Manufacturing stretchable electronic devices can be complex and expensive compared to traditional methods.

Processing Control: Some processing techniques used for stretchable electronics are difficult to control precisely.

Power Limitations: Currently, stretchable electronics generally lack the power and performance to fully replace traditional printed circuit boards (PCBs) in all applications.

Stretchable electronics offer exciting possibilities for flexible and wearable devices.

Addressing conductivity, energy density, and fabrication limitations is crucial for wider adoption.

While not a perfect replacement yet, stretchable electronics present promising advancements for specific applications.

Tiny, inflatable bladders could be strategically placed within deformable displays. By carefully controlling the inflation and deflation of these bladders with electrical signals, it might be possible to simulate finger movement and grasping. Imagine miniature balloons that inflate and deflate to bend or straighten specific parts of the hand, mimicking the actions of real muscles. Inflatable bladders are an additional example of a simple technology with a wide range of applications. These are essentially sealed pockets that can be filled with air or fluid, causing them to expand and change shape. This ability to transform upon inflation shares some similarities with (SMAs) and (EAPs). For example, both inflatable bladders and SMAs exhibit a change in shape based on external stimuli. In SMAs, it is a temperature change, while for bladders, it is the inflation or deflation of air. Further, like EAPs, inflatable bladders can also be controlled electrically. In EAPs, electrical current directly causes the shape change, whereas for bladders, the electrical signal might control a valve that regulates inflation with air. Inflatable bladders offer some distinct advantages:

Simplicity: The basic concept of an inflatable bladder is relatively straightforward and inexpensive to produce compared to some other technologies.

Scalability: Inflatable bladders can be made in various sizes, making them suitable for a wide range of applications.

Reversibility: They can be easily inflated and deflated, allowing for reversible shape changes.

Despite these advantages, inflatable bladders also have limitations:

Durability: Depending on the material, they might be susceptible to punctures or tears.

Control Complexity: Achieving precise and controlled inflation for complex shape changes can require additional engineering. Force limitations: Inflatable bladders may not be suitable for applications requiring high force output. Overall, inflatable bladders offer a versatile and adaptable approach for achieving shape transformation. Their similarities and differences compared to other materials like SMAs and EAPs highlight the diverse toolkit available for engineers and designers seeking to create innovative solutions.

Preferred Embodiment

A preferred embodiment of an organic responsive user interface system that converts data into a three-dimensional dynamic object 101 includes an interaction point 103 that is in digital communication with a computing device either directly or via a network. The existing traditional consumer electronic device (CED) (e.g. smartphone, tablet, smart watch, personal computer, laptop, TV, etc.) provides data or a data stream (e.g. machine code, byte code, object code, source code and all other types of code and transmitted data) to interaction point 103.

The preferred embodiment illustrated in FIGS. 15 and 14 and in FIGS. 2, 6, 7, 8 and 9 employs a Polydimethylsiloxane (PDMS)-based dielectric elastomer (DE) combined with a layer(s) of the following: plasticizer (Diisononyl phthalate (DINP), diethyl hexyl phthalate (DEHP), softening agent, UV stabilizer, a thickener such as fumed silica and Alumina (AI203), fillers (silica ($SiO_2$), Calcium carbonate (CaCO3), and a recommended layer of thermoplastic polymer (polyurethane (PU) and polyethylene (PE).

Layer 1: Polydimethylsiloxane (PDMS)-based dielectric elastomer (DE) having a Thickness: 0.5-1 mm. Purpose: Base layer providing elasticity for deformation. Function: Enables stretching and deformation of the ID. Fatigue Resistance: High (can withstand repeated stretching and deformation). Temperature Range: −50° C. to 150° C..

Layer 2: Softening Agent having Thickness: 10-50 μm. Purpose: Improves stretchability and reduces stress. Function: Enhances flexibility and durability of the DE layer. Fatigue Resistance: Medium (can withstand some repeated stretching). Temperature Range:-20° C. to 100° C.

Layer 3: UV Stabilizer having Thickness: 10-20 μm. Purpose: Protects against UV degradation. Function: Prevents material breakdown and discoloration. Fatigue Resistance: High (resistant to UV degradation). Temperature Range: −20° C. to 100° C.. Layer 4: Fillers (dispersed within the DE layer). Total Thickness: 10-30% by weight of DE layer. Purpose: Enhances strength and shape retention. Function: Provides mechanical support and stability. Fatigue Resistance: Medium (can withstand some repeated stretching). Temperature Range:-50° C. to 150° C.

In an alternative embodiment, an optional layer of pigments (titanium dioxide (TiO2), iron oxide (Fe2O3), and carbon black, as well as artificial chromatophore cells, nanostructured periodicity and artificial melanophore cells which were discussed previously.

In yet another alternative embodiment, an optional layer of texturing agents (silica gel and aluminum oxide (AI203).

Layer 5 (Optional): Thickener. Thickness: 1-10 μm. Purpose: Adjusts material properties. Function: Modifies viscosity and flow behavior. Fatigue Resistance: Low (may degrade quickly with repeated stretching). Temperature Range:-10° C. to 50° C.

Layer 6 (Optional): Plasticizer. Thickness: 1-10 μm. Purpose: Enhances elasticity. Function: Increases flexibility and deformability. Fatigue Resistance: Medium (can withstand some repeated stretching, but may degrade over time). Temperature Range: −20° ° C. to 100° C.

Layer 7 (Optional): Thermoplastic Polymer (PU/PE). Thickness: 0.1-0.5 mm. Purpose: Provides structural support and tear resistance. Function: Prevents electrical shock, enhances durability, and improves handling. Fatigue Resistance: High (can withstand repeated stretching and deformation). Temperature Range: −50° C. to 150° C..

Layer 8 (Optional): Texturing Agents. Thickness: 10-50 μm. Purpose: Improves grip and texture. Function: Enhances surface properties and usability. Fatigue Resistance: Medium (can withstand some repeated stretching, but may degrade over time). Temperature Range: −20° ° C. to 100° C.

Bonding and Equipment for Preferred Embodiment

Figure 20:
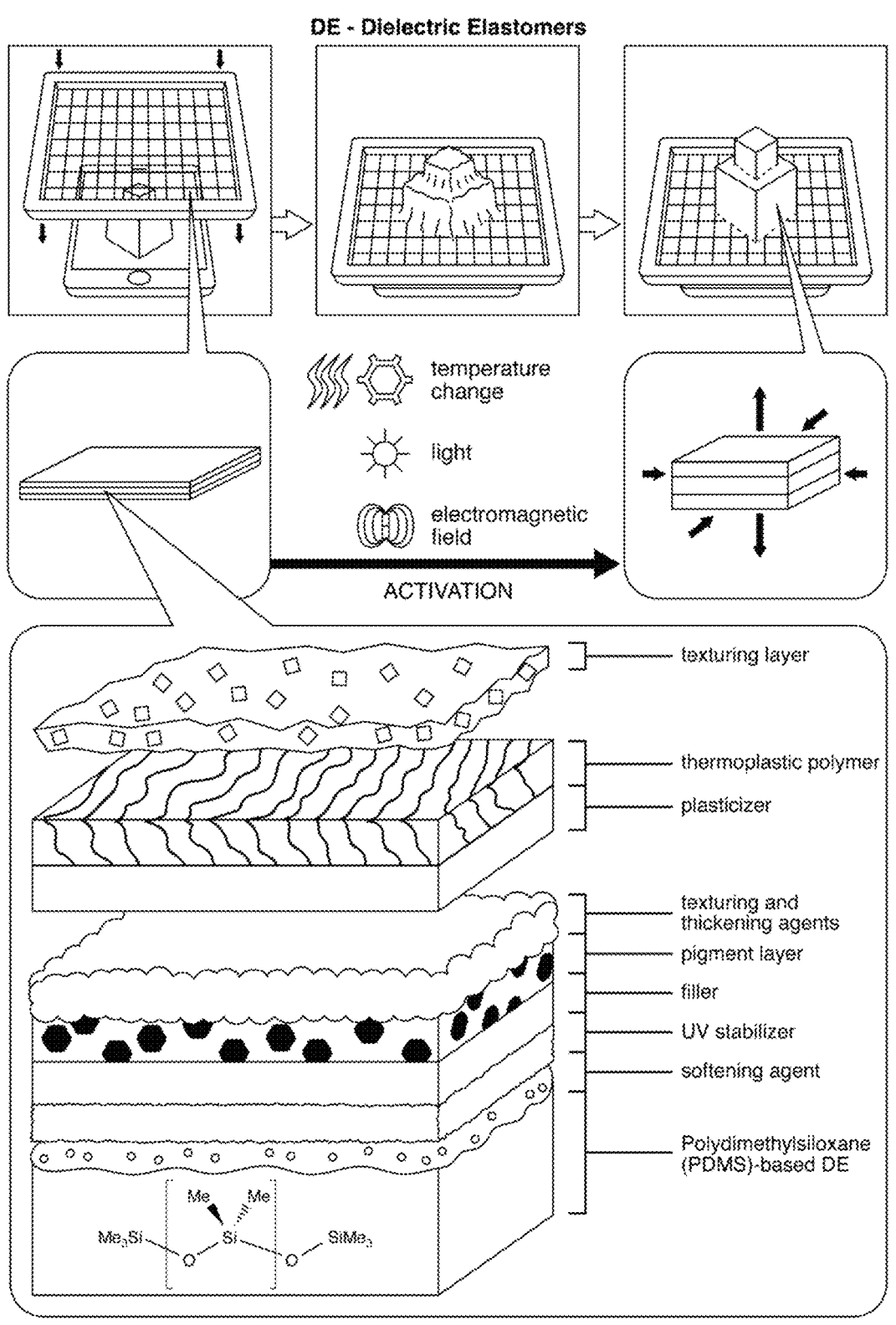
FIG. 20 illustrates a breakdown of which layers bond together and the equipment commonly used for their manufacture at the specified thickness range.

The following breakdown, as illustrated in FIG. 20, of which layers bond together, is followed by a list of the type of equipment commonly used for their manufacture at the specified thickness range:
Bonding:

Layers 1 & 2: PDMS (elastomer) and silicone oil (lubricant) likely form a physical or weak chemical bond, creating a single, functional layer.

Layer 3: UV stabilizers are typically mixed into the PDMS or other polymer during fabrication, not applied as a separate layer.

Layers 4 & 5 & 6: Fillers (silica, calcium carbonate), pigments (metal oxides, artificial cells), and texturizing agents (silica gel, aluminum oxide) are usually mixed into the PDMS base or another polymer matrix to create a composite layer.

Layer 7: Plasticizers are often added directly to the polymer (PU or PE) during processing to improve flexibility.

Layer 8: The thermoplastic polymer (PU or PE) likely forms a separate layer bonded to the composite layer (4, 5, & 6) through adhesion or a chemical bonding agent.

Layer 9: The top texturing layer (silica gel and aluminum oxide) might be bonded to the thermoplastic layer (8) using adhesives or surface treatments.

Layers 1-6 (PDMS-based DEs, softening agent, UV stabilizer, fillers, pigments, and texturing and thickening agents) are combined into a single layer, layers 7 and 8 (plasticizer and thermoplastic polymer) are combined into another layer, and layer 9 (texturing agents) is a separate layer, creating 3 combined layers as shown in FIG. 20.

Equipment by Layer:

The equipment used for manufacturing each layer varies, with some layers combined due to their material properties.

Layers 1 and 2, consisting of PDMS and silicone oil, are typically manufactured using spin coating (10 nm-100 µm) or casting (100 µm-several mm).

Layer 3, comprising UV stabilizers, is usually mixed in during the processing of other layers.

Layers 4, 5, and 6, which include fillers, pigments, and texturizing agents, are manufactured through compounding (variable, often micrometer scale) and extrusion (variable, often micrometer scale).

Similarly, layer 7, consisting of plasticizers, is mixed in during polymer processing.

Layer 8, made of thermoplastic polymer (PU or PE), is manufactured using film blowing (10 µm-1 mm) or calendering (100 µm-several mm).

Finally, layer 9, comprising texturizing agents, is applied using screen printing (10 µm-100 µm) or dip coating (1 µm-100 µm).

For complex shapes such as a human hand, inflatable bladders and fluid-filled cavities would be integrated into the layer structure, spanning Layers 5-7. These bladders or cavities, integrated within layers 5-7 (exact placement depending on design), offer several key functionalities: Thickness: 0.5-5 mm—This range allows for customization based on the application. A thicker bladder might be needed for larger deformations or higher pressure requirements.

Fatigue Resistance: Medium to High—These bladders can withstand repeated inflation and deflation cycles, but may experience degradation over time. The specific material and design will influence the lifespan. Temperature Range: −20° C. to 80° C.—This range can be affected by the chosen fluid or material. Extreme temperatures might compromise the bladder's integrity.

Material and Healing Properties: The ideal material for these bladders would be a flexible elastomer like silicone (layer 4, fillers) or polyurethane (layer 7). These materials offer good elasticity and durability. Additionally, the bladders can incorporate self-healing capabilities for extended functionality.

Healing Agents: Microcapsules embedded within the bladder walls contain a healing agent, typically a polymeric or silicone-based material. Upon damage, these capsules release the agent, filling cracks and restoring the bladder's integrity.

Healing Methods:

Autonomic Healing: This method relies on automatic release of the healing agent in response to damage, promoting self-repair.

Thermal Healing: Applying heat or light triggers the healing agent to polymerize and repair the damage.

Chemical Healing: This method involves applying a catalyst or solvent to initiate a chemical reaction that repairs the damage.

For optimal functionality, the healing methods and materials for the bladders should be compatible with the other layers. This would allow for a unified healing process where damage to any layer triggers a repair mechanism(s) (RHP) that restores the entire structure simultaneously.

Example: The thermoplastic polymer layer (Layer 7) is formulated to respond to the same thermal healing method used for the bladders. In this case, both layers could be repaired simultaneously by applying heat or light. Similarly, the softening agent layer (Layer 2) could be designed to work with the autonomic healing method, enhancing the overall self-healing capabilities of the entire ID structure.

An additional method of enablement is achievable via an electroactive shape memory polymer (EASMP) with a hydrogel-based composite (HBC) known as Poly(N-isopropylacrylamide) (PNIPAM) hydrogels with embedded electrodes and the layers mentioned. It will be understood that those in the art may vary both the amount of layers and components they use to achieve shape-changing healable material displays.

It is noted and included in this patent that embodiments using other types of stimuli specifically hydrogels (e.g. Poly(ethylene glycol) (PEG) hydrogels with photoreactive groups, Poly(vinyl alcohol) (PVA) hydrogels with thermoresponsive properties, Poly(acrylic acid) (PAA) hydrogels with pH-responsive properties, Poly(urethane) (PU) hydrogels with solvent-responsive properties, Poly(ethylene oxide) (PEO) hydrogels with thermoresponsive properties, etc. are expressly covered and included.

Additional embodiments using suitable composites include but are not limited to all previously discussed materials (e.g. LCEs, SHPs, DCCs, DCPs, RPNs, SMPNs, SMAs, EAPs, stretchable electronics, bladders, etc. all of which expressions are expressly covered in this patent.

Figure 17:
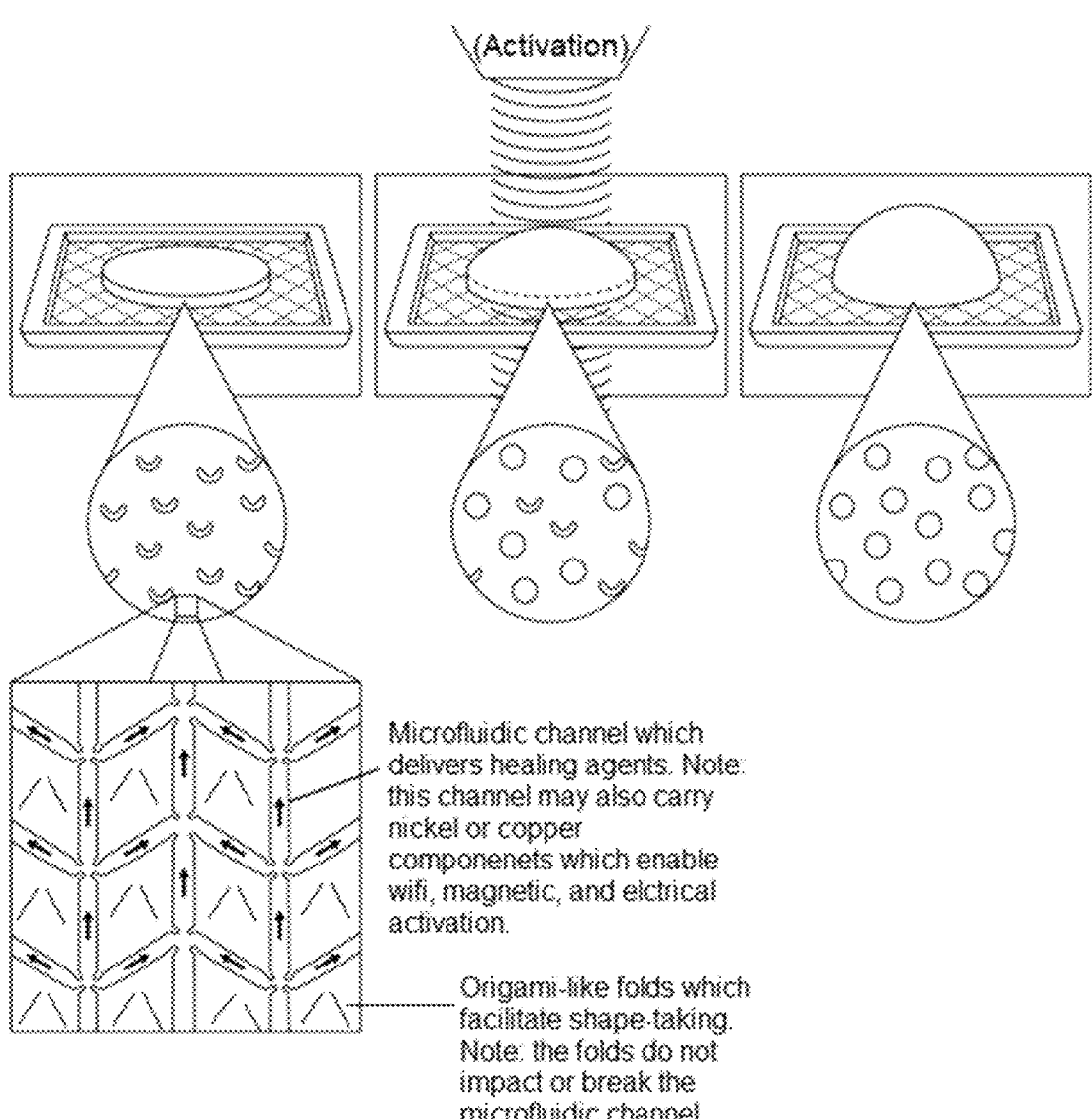
FIG. 17 illustrates the Metamaterials taught by the present invention.

Those in the art in order to obtain detailed, specific user-specified shapes will also use other highly customized polymers, metamaterials as shown in FIG. 17 including metaliquids with activation methods ranging from wifi to electrical power to ultrasound, etc.; (preferably) thermosets, elastomers, thermoplastics; and preferably doped polymers (dielectric elastomers, EASMPs and PNIPAM, etc). In the field of polymer material science, doping refers to the technique of incorporating charge carriers into conductive polymer hydrogels (CPHs) to enhance their electrical characteristics.

The activation of the metamaterials shown in FIG. 17 may vary; it could be a stylus (like people used on the original BLACKBERRY devices) if the material requires magnetic activation or partial leviathan of the deformed media; the stylus might also emit ultrasound as an activator, etc. Also, some material might need thermal activation to a degree that human hands interacting with the material might not be safe, so a stylus would be used in that case as well.

The specific dopant selected, the strength of doping, and the degree of doping all contribute to the determination of CPH conductivity, un-doped; natural, synthetic, addition, condensation, coordination, as well as rearrangement polymers; fibers/fibres, etc. and those in the art will use a combination of the materials listed herein to achieve the functionality they require. All combinations of these materials are expressly covered in this patent.

Healing

The present invention's embodiments also include a redundant healing process (RHP) as shown in FIG. 15, which heals stress, strain and cracks via multiple healing agents and delivery mechanisms. Together these healing processes harness the unique properties of EASMP and PNIPAM to achieve comprehensive healing.

Firstly, the thermoresponsive nature of PNIPAM allows it to self-heal through reversible hydrophobic interactions, reforming its polymer chains upon cooling (example: poly (N-isopropylacrylamide) hydrogels). Simultaneously, the dynamic covalent bonds within EASMP enable it to self-heal through reversible cross-linking, reforming its network structure (example: Diels-Alder reaction).

Additionally, microfluidic channels composed of carbon nanotubes are integrated into the material, delivering healing agents such as epoxy resins that enhance the repair process (example: polymeric nanoparticles).

As a fourth step, the material is exposed to a specific wavelength of light, triggering a photochemical reaction that further reinforces the healed area (example: UV-induced cross-linking with benzophenone).

Finally, the material's surface is treated with a bio-inspired enzyme, such as lipase, which catalyzes a biochemical reaction, resulting in the growth of new polymer chains that fully restore the material's original properties (example: lipase-catalyzed polymerization of ε-caprolactone).

Electronic components will vary based on input and output needs as well as industrial and nonindustrial application of the present invention. The following is a list of required (and optional but preferred) electronic components, their location (e.g. a consumer's electronic device (CED) (e.g. smartphone, smartwatch, tablet, etc.) or the present invention device (ID), and a brief description of the component:

User software application, CED, this app allows users to capture or upload images, potentially integrates with social media, and transmits silhouette data to the present invention.

Image Pre-Processing (preferred), CED, basic image processing like cropping or resizing might be done on the user's device before silhouette extraction.

Silhouette Extraction, ID, software within the ID's control system which analyzes the uploaded image and extracts the user's silhouette data.

Feature Recognition (optional), ID, software might analyze the silhouette for basic features like posture or clothing orientation to optimize the movement.

Movement Algorithm (e.g. formulas designed to optimize shape creation from the EASMPs and PNIPAM as shown in FIG. 14, including but not limited to: Targeted Muscle Activation (TMA) which is computationally heavy, model-mased control (preferred), and learning-based control, etc.), ID, this core software translates the silhouette data into specific instructions for each EASMPs and PNIPAM ligament, determining contraction or expansion lengths.

Safety Control Software, ID, software monitors sensor data and ensures safe operation by implementing emergency shutdowns, movement limitations, or collision avoidance with users.

Ligament Control Interface, ID, this software module directly controls the EASMPs and PNIPAM ligaments as shown in FIG. 14 by sending electrical pulses based on the movement algorithms' instructions.

Communication Module, ID, this module establishes communication with the user's device (preferably via Wi-Fi) to receive silhouette data and potentially send confirmation messages.

Security measures (encryption) must also be implemented during data transmission between the consumer electronic device (e.g. smartphone, tablet, laptop, PC, smartwatch, smart TV, human-computer interface (HCl), brain-computer interface (BCI), etc.) (CED) and invention device (ID).

For optimal performance, it is preferred that the specific allocation of tasks between the CED app and the ID's control system should be further optimized based on factors like processing power limitations on CED and the complexity of employed silhouette extraction types and techniques (background subtraction techniques (e.g. Frame Differencing, Running Average, Median Filtering, Gaussian Mixture Models (GMM); semantic segmentation techniques (e.g. DeepLab, U-Net, Mask R, CNN; multi-view segmentation techniques (e.g. shape-from-silhouette (SFS), stereo vision, etc.). The following flowchart illustrates the components of the present invention (ID) control system and how they interact.

Figure 19:
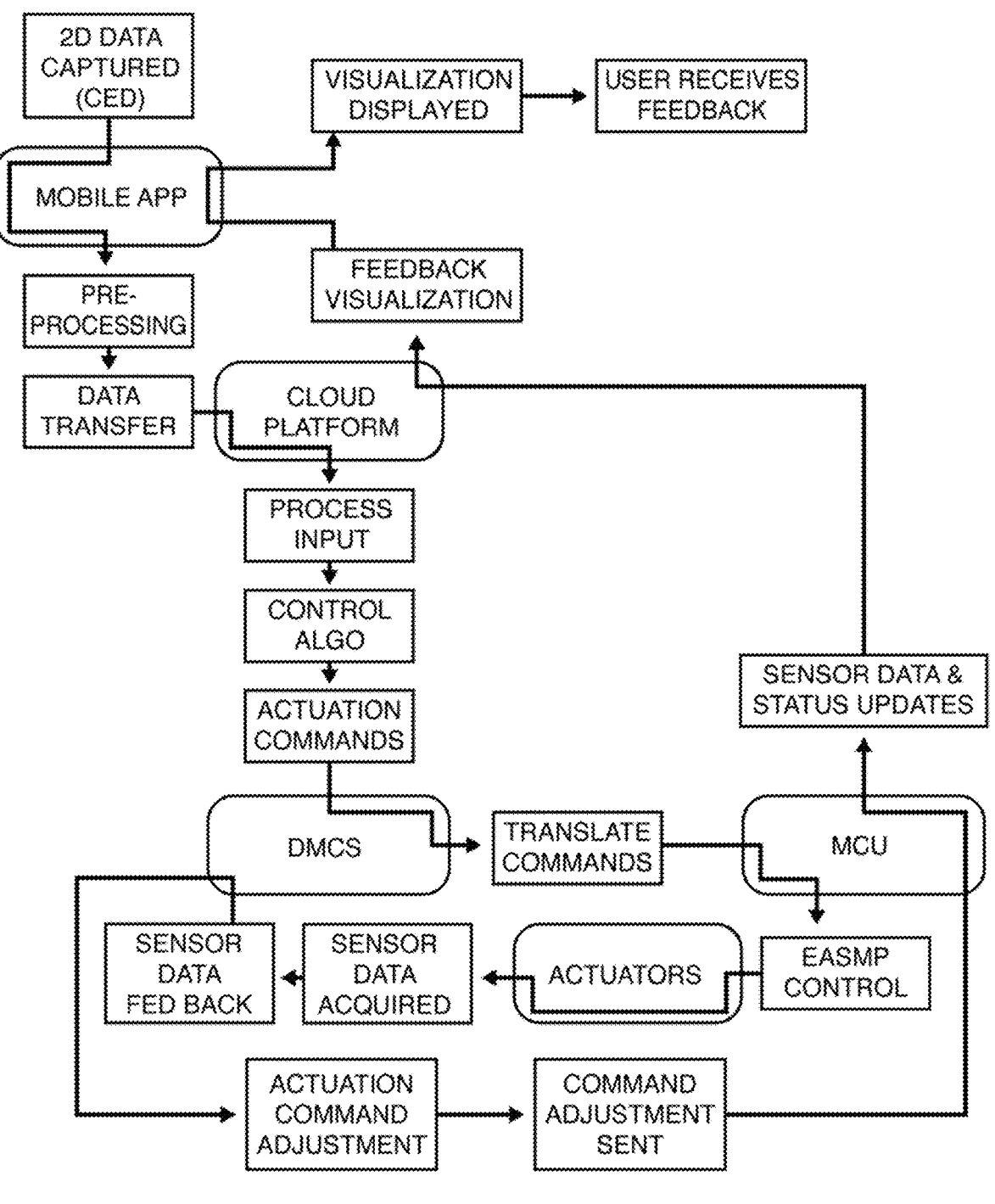
FIG. 19 illustrates the Realized Flowchart for the Control System (ID).

FIG. 19 is a Realized Flowchart for the Control System (ID). The control system starts with User Interaction: Capture Data (2D/3D): The user captures data (silhouette, image, etc.) using the CED app.

(Optional) Pre-Processing (CED App): The app might perform basic pre-processing on the data (cropping, resizing).

Data Transmission: Transmit Data to Cloud: The captured data is transmitted from the CED app to the Cloud.

Cloud Processing: Convert Data to FAMPA: The Cloud converts the received data (silhouette, image) into Force-Aware Motion Planning Algorithms (FAMPA).

In an alternative embodiment, FAMPA is used: During the Redundant Healing Process (RHP), the Cloud updates FAMPA based on sensor data and strain gauge data from the ID.

Convert FAMPA to Output (2D/3D): The Cloud converts the FAMPA data (original or updated) into a suitable format for the ID (2D or 3D depending on processing needs).

ID Processing and Actuation: Receive Data (FAMPA): The ID receives the FAMPA data from the Cloud. Deformation based on FAMPA: The ID deforms its shape based on the instructions within the FAMPA data (using materials like EASMP/PNIPAM, LCE, EAP, DE, or metamaterials).

User Interaction and Feedback: User Interaction is optional in an alternative embodiment: The user interacts with the deformed ID through touch (optional).

Sensor Data and Strain Gauge Feedback: Sensor data and strain gauge data are collected from the ID during interaction.

Redundant Healing Process (RHP): Start RHP (Triggered by Deformation): The deformation process initiates the Redundant Healing Process (RHP). Transmit Updated FAMPA (During RHP): While healing, the ID transmits updated FAMPA data (based on sensor feedback) to the Cloud.

Return to Cloud Processing: Update FAMPA (Based on RHP Data): The Cloud updates the original FAMPA data based on the information received during the RHP (sensor data, strain gauges).

Return to Data Transmission: Transmit Updated Data to CED (Optional): The Cloud transmits the updated data (optional) back to the CED app for potential user feedback or further processing.

The flowchart of FIG. 19 focuses on the core functionality. Optional steps like pre-processing, feature recognition, and safety controls can be integrated within relevant blocks.

Figure 18:
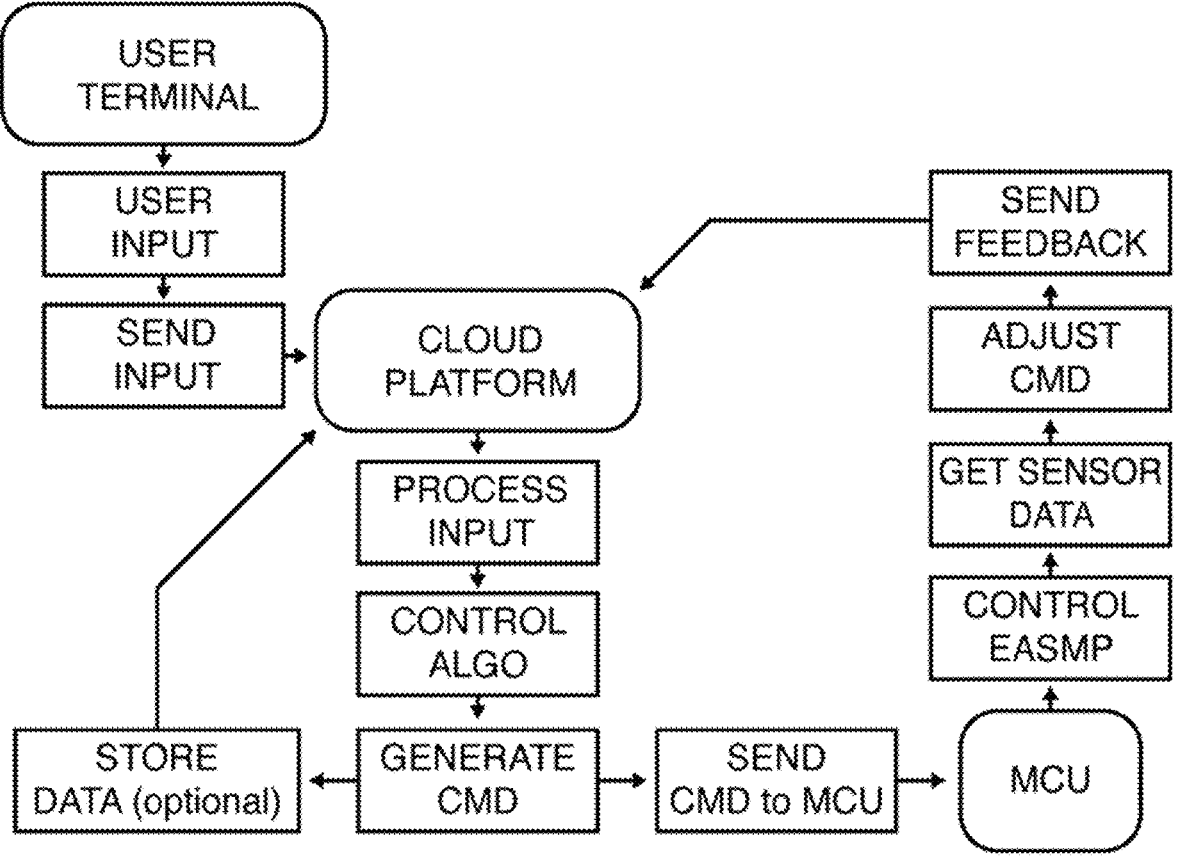
FIG. 18 is a control system flowchart of the present invention.

FIG. 18 illustrates the control system flowchart. A [User transmits data (2D/3D) from CED to Cloud]->B {Cloud converts data to Force-Aware Motion Planning Algorithms (FAMPA)}. B->C {Cloud transmits FAMPA to Invention Device (ID)}. C->D {ID deforms based on FAMPA output (EASMP/PNIPAM; LCE, EAP, DE; Metamaterials aka "deformed media")}. D->E {User physically interacts with deformed media of ID. This interaction updates the received FAMPA}

E->F {Deformed media of ID starts Redundant Healing Process (RHP)}

F->G {While healing, ID transmits updated FAMPA to Cloud}

G->B {Cloud updates FAMPA based on sensor data and strain gage data}

F->H {Cloud converts updated FAMPA data (from FAMPA to #D or from FAMPA to 3D to 2D)}

H-> [{Cloud transmits updated data to CED}

Note: Dashed lines with arrows represent data flow within the Redundant Healing

Process (RHP) loop.

Explanation:

The user captures data (2D/3D) using the CED app (A->B).

The captured data is represented as silhouette data (B->C).

The silhouette data is transmitted to the control system via the communication module (C->D).

The control system receives the data (D->E).

Optional Pre-Processing:

The data can optionally undergo pre-processing steps like cropping or resizing (E->F->G->E).

Silhouette Extraction:

Regardless of pre-processing, the data is processed to extract the silhouette of the object (E->H).

Movement Control and Actuation:

The silhouette data is sent to the ID control software (H->I).

Optional steps within the control software involve selecting filters and performing feature recognition (I->J, K->I).

The software then utilizes a movement algorithm to determine how the ID should deform (I->L).

This information is sent to the ligament control interface, which translates it into electrical pulses for the ID's ligaments (L->M).

Safety control software monitors the process and ensures safe operation (M->N)

Electrical pulses are sent to the shape-changing ligaments (EASMP and PNIPAM) to control the ID's movement (N->O->P->Q).

User Interaction and Safety:

The user interacts with the deformed ID through touch (Q->R).

Safety controls are constantly monitoring the interaction to ensure user safety (R->S).

Feedback Loop (Optional):

A dashed line from the safety controls block(S) to a block labeled "Feedback to User and System" (T) indicates the potential for a feedback loop. This allows the system to learn from user interactions and improve its performance over time.

Note: When the present invention device is used for surgeries and other medical procedures, FAMPA will include:

Kinematics and Path Planning (e.g., Denavit-Hartenberg, Rapidly-exploring Random Tree (RRT), etc.).

Computer Vision and Image Processing (e.g., thresholding, deep learning models for tissue segmentation (e.g., U-Net, DeepLabv3+, Attention-based U-Net), etc.)

Robot-Instrument Interaction (RI Interaction) (e.g., impedance control, Kalman filtering, etc.).

Surgical Task Optimization (e.g., motion planning algorithms (e.g., Probabilistic Roadmaps (PRM)), surgical workflow prediction models ((e.g., RNNs with LSTM, Transformer-based models)), etc.

The user interacts with the CED app to capture or upload an image.

Optionally, the app might perform basic pre-processing on the image (cropping or resizing).

The image data is then transmitted to ID.

The ID's control system extracts the silhouette data from the image.

Optionally, the system might perform basic feature recognition on the silhouette.

The core movement algorithm translates the silhouette data transmitted from CED into specific instructions for each EASMP and PNIPAM ligament as shown in FIG. 14.

The safety control software ensures safe operation and monitors sensor data.

The ligament control interface sends electrical pulses to the EASMPs and PNIPAM ligaments as shown in FIG. 14 based on the movement algorithm's instructions.

The EASMPS and PNIPAM ligaments as shown in FIG. 14 contract or expand, causing the rectangular panels as shown in FIG. 6 to move and reshape ID to resemble the user's silhouette.

The user can interact with the ID's created shapes through touch (optional). Safety controls are triggered if necessary.

FIG. 19 illustrates the control system architecture for creating 3D shapes using EASMP and PNIPAM as shown in FIG. 14, optimized for cloud computing and minimal response time. The system leverages a cloud-based control platform for high-level functionalities and user interaction, while an MCU unit handles real-time control and sensor feedback at the edge. The user interacts with the system through a mobile app on their consumer electronic device.

Hardware Components are illustrated in FIG. 19.

Microcontroller Unit (MCU): Processes control algorithms and sensor data. Controls EASMP actuators.

Motor Drivers: Amplify MCU signals to drive EASMP actuators.

Sensors: Strain gauges measure deformation (shape) of the EASMP material. Optional and recommended: temperature sensors, position sensors.

A Wireless Communication Module enables communication between MCU and cloud platform (BLE or cellular).

The hardware components work together to execute control commands and provide feedback. The MCU acts as the brain of the system, running the control software and managing communication. Motor drivers translate the MCU's low-power signals into the power needed to drive the EASMP actuators.

Sensors monitor the physical state of the EASMP structure, with strain gauges being crucial for tracking deformation (shape).

Additional sensors like temperature sensors or position sensors can provide more comprehensive feedback depending on the application's needs. Finally, the wireless communication module transmits data between the MCU and the cloud platform.

Software Components. Embedded Control Software (on MCU): Executes chosen movement algorithm. Reads sensor data for real-time feedback. Adjusts actuation commands based on feedback. Communicates with cloud platform.

Cloud-Based Control Platform: User interface for defining shapes and interacting with the system. Processes and interprets user input. Sends control instructions to MCU. Receives sensor data and control system status updates from MCU. Performs complex computations or machine learning (if applicable). Data storage and management.

Mobile App (preferred): User interface on consumer electronic device (smartphone, etc.) Defines target shapes, initiates commands, receives visual feedback.

The software components handle high-level control logic, user interaction, and data processing. The embedded control software running on the MCU translates high-level instructions into real-time actuation commands and leverages sensor feedback for control adjustments. The cloud-based control platform acts as the central hub, managing user interaction, communication with the MCU, and potentially performing complex computations or machine learning tasks. The mobile app provides a user-friendly interface for interacting with the system and receiving visual feedback on the deformed shape.

A [CED (2D Input)]->B {Mobile App (Optional)}. B->C {Cloud Platform (CSP)}. C->D {Process User Input}. D->E {Control Algorithm}. E>F {Generate Actuation Commands}. C->G {Deformable Media Control System}. G->H {Microcontroller Unit (MCU)}. H->I {Control EASMP Actuators (Shape Creation)}. I->J {Sensor Data Acquisition (Strain Gauges, etc.)}. J->H. H->K {Control Adjustments (based on feedback)}. K->I. G->L {Wireless Communication Module (BLE or Cellular)}. L->C {Sensor Data & Status Updates}. C->M {Visualize Feedback (Optional)}. M->B {Mobile App (Optional)}. B->A {User Smartphone}.

User Input: A: User captures 2D data using CED. B: Mobile App performs pre-processing on the data (if applicable).

Data Transmission: B->C: Data is transmitted to the Cloud Platform (CSP).

Cloud Processing: C: Process user input (data from CED or Mobile App). C->D: Control algorithm generates actuation commands.

Deformable Media Control: C->G: Actuation commands are sent to the Deformable Media Control System. G->H: Deformable Media Control System translates commands for the MCU. H->I: MCU controls EASMP actuators for shape creation.

Sensor Feedback: I->J: Sensor data (strain gauges, etc.) is acquired during actuation. J->H: Sensor data is fed back to the MCU.

Control Adjustments: H->K: Based on feedback, control system might adjust actuation commands. K->I: Adjusted commands are sent back to the MCU.

Wireless Communication: G->L: Sensor data and status updates are transmitted to the CSP via wireless communication (BLE or Cellular).

Optional Feedback Visualization: C->M: Cloud Platform visualizes feedback data for the user. M->B: Visualized feedback is displayed on the Mobile App.

User Interface: B->A: User receives feedback on the Mobile App or Smartphone.

This flowchart provides a visual representation of the data flow and control processes within the system.

FIG. 19 user input is transmitted to the cloud platform (CSP) through the internet connection (router or cellular network). The cloud platform processes the user input. The cloud platform executes the chosen control algorithm to determine the necessary actuation commands. Based on the algorithm and user input, the cloud platform generates actuation commands for the EASMP actuators. The cloud platform transmits the actuation commands to the Deformable Media Control System. The Deformable Media Control System receives the commands. The Microcontroller Unit (MCU) within the control system interprets the commands and controls the EASMP actuators to create the desired shape in the deformable media. Sensors (strain gauges) within the control system acquire data on the actual shape of the deformable media. The MCU uses the sensor data to make any necessary adjustments to the control commands for precise shape formation. The control system transmits the sensor data and status updates back to the cloud platform.

In an alternative embodiment, the cloud platform can visualize the feedback data (e.g., estimated 3D model of the shape) for the user.

In an alternative embodiment, the visualized feedback is sent back to the mobile app on the user's smartphone.

The user can observe the feedback on their smartphone and potentially make further adjustments to the desired shape if needed.

Figure 2:
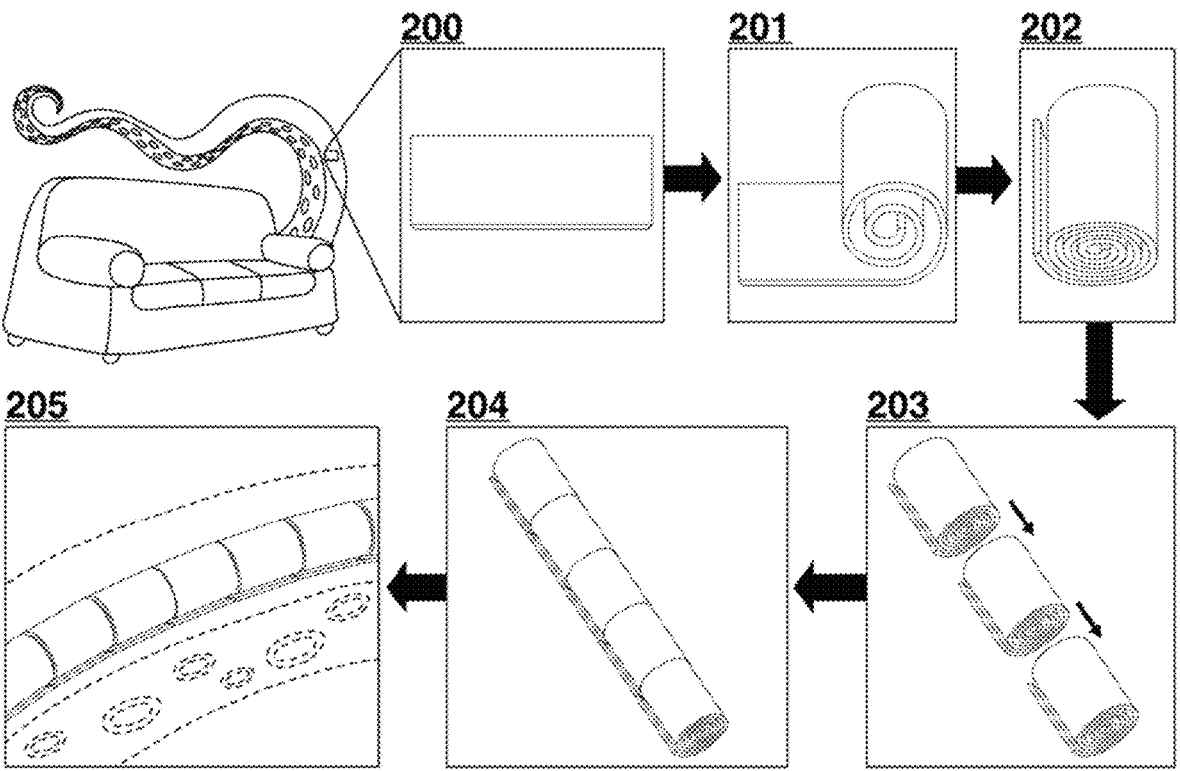
FIG. 2 is a perspective view and multiple magnified views of one type of embodiment of the present invention
Figure 3:
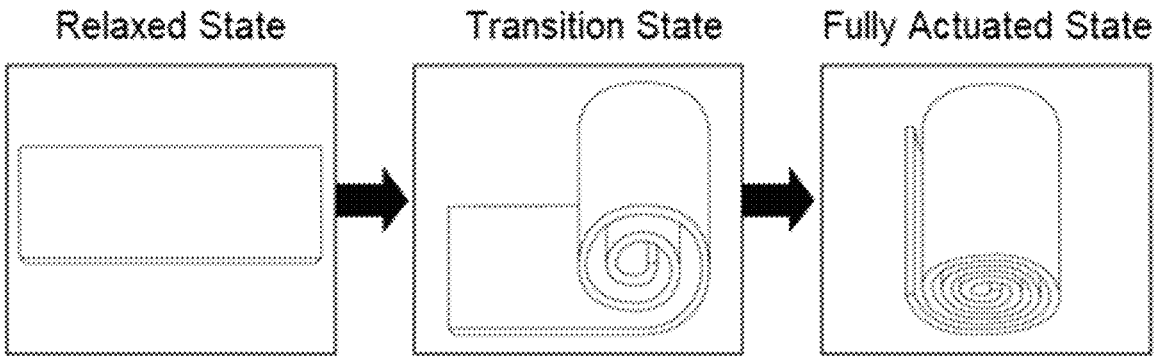
FIG. 3 is a representation of the relaxed state, transition state, and fully actuated state of dielectric elastomers which is an example of a material capable of the functions described herein.
Figure 3:
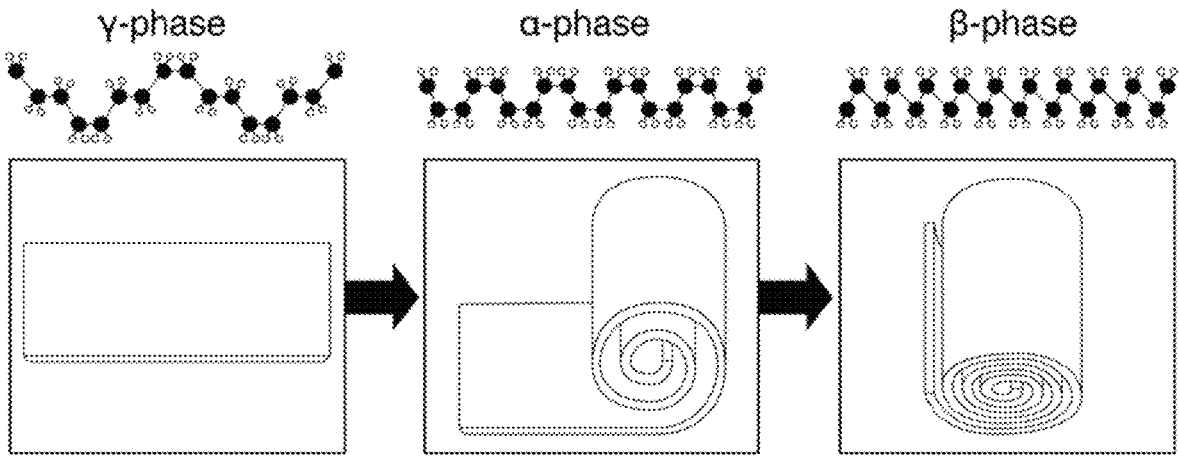

Referring now to FIG. 2 and FIG. 3, the interaction point 103 includes a plurality of surfaces. The plurality of surfaces are arranged as shown in FIG. 5 via The following 2D-to-3D data conversion algorithms (e.g., COLMAP, OpenMVS) provide output which is then converted to physical shape creation dimensions via 3D data-to-physical object algorithms (e.g., Inverse Kinematics, A search*). The following 2D-to-3D and 3D data-to-physical object algorithms are preferred as the CED-transmitted data may be simple, medium, or complex, suggested: for simple data: COLMAP, Inverse Kinematics; for medium complexity data COLMAP and modified Rapidly Exploring Random Tree (modified to consider dynamic constraints) (mRRT); and for complex data: COLMAP with Mesh Refinement and Point Cloud Registration.

The projection module is used then to create a representation of information from the transmitted data stream. Representation is a three-dimensional dynamic object that extends out and away from the interaction point 103. The present invention is capable of taking more than one shape. As the data stream provides new information (e.g. another image, another phrase or text, another portion of a video or streaming data, etc.), the representation in the present invention after returning to an at-rest non-activated state, the device will then follow the process as shown in FIG. 5 and conform into the transmitted data, adapting and deforming into new shapes and forms.

A representation (i.e. the 3D physical and non-static representation via the polymer based on the CED-transmitted data stream) takes on any form (i.e. the EASMP and PNIPAM have the capability of creating basic geometries (e.g. cubes, prisms, pyramids, etc. as shown in FIG. 14 as well as up to and including a human face (at a medium to high resolution meaning that every detail (e.g. skin wrinkles) as directed by data stream as shown in FIG. 5 (data stream is directed by electronic device user, smart speaker on either the present invention or the electronic device).

Achievable outputs have the following characteristics: geometric resolution of 0.25-0.5 millimeters (mm) based on COLMAP, SfM, and NeRF output (e.g. a base resolution of 1 millimeter for a human face from COLMAP, SfM, and NeRF and Control System.

Even with high-precision control, translating COLMAP, SfM, and NeRF data into perfect actuation requires model training); minimum feature Size of 50-100 micrometers (μm) (note: smaller resolutions are achievable with more detailed research and fine-tuning; these are explicitly covered within the scope of this patent); geometric resolution of 0.25-0.5 millimeters (mm) considering the base resolution from 3D reconstruction algorithms like COLMAP, SfM, and NeRF and limitations of the control system; feature fidelity:

capturing the basic human face shape (eyes, nose, mouth) with some definition is achievable; dimensional accuracy: accuracy for the overall face shape (eye placement, nose position) is achievable.

Figure 8:
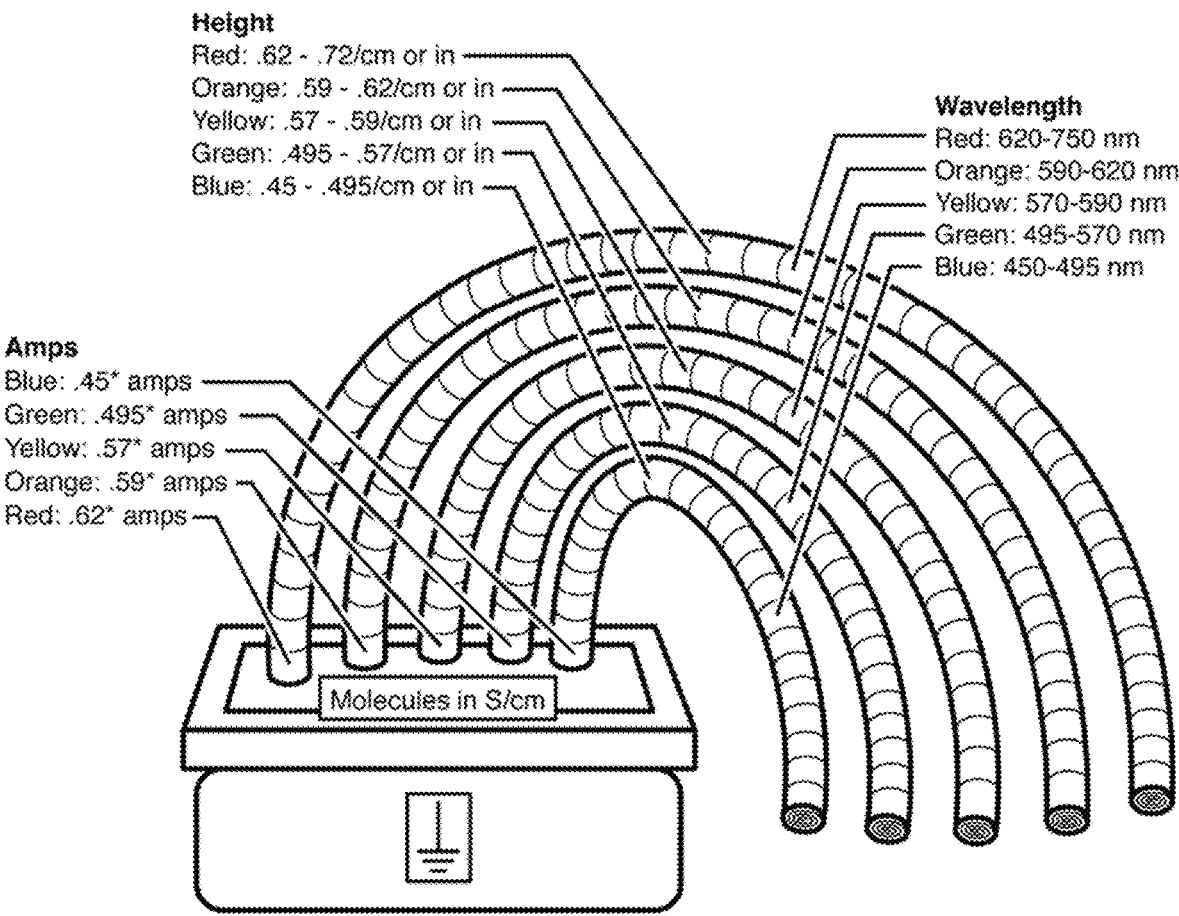
FIG. 8 is a presentation of an image (e.g. a rainbow) taking a physical shape from the deformable media/the present invention.

Examples of possible representations include basic geometries (e.g. 2D and 3D shapes) as well as more detailed images (e.g. a human face, a rainbow as shown in FIG. 8, etc.) in response as shown in FIG. 5 to electronic device's browser(s) containing the requested resource, its path and parameters, and data sources graphics, medical imaging, text, pictures, charts, interactive buttons, renderings, and the like. Streaming media and video are also able to be streamed to the present invention device with the caveat that data streams the present invention takes the shape of, with the resolution and speed specified by those in the art based on their use cases.

In the preferred embodiment, surfaces are attached to or integral with a plurality of sheets, or another structure type, that respond to electrical current to modify their configuration. In a first state (at-rest state) the sheets are generally planar. 200 When electrical current or another stimulus is applied thereto via a projection module, the sheets or very small portions of the present invention's horizontal planar at-rest state begin to roll up 201 on themselves 202 to form a plurality of cylinders.

Other types of stimuli are air from small actuators, vacuums, pumps, bladders, meta materials including meta fluids, LCE, EAP, DE, ACC, etc.

Figure 7:
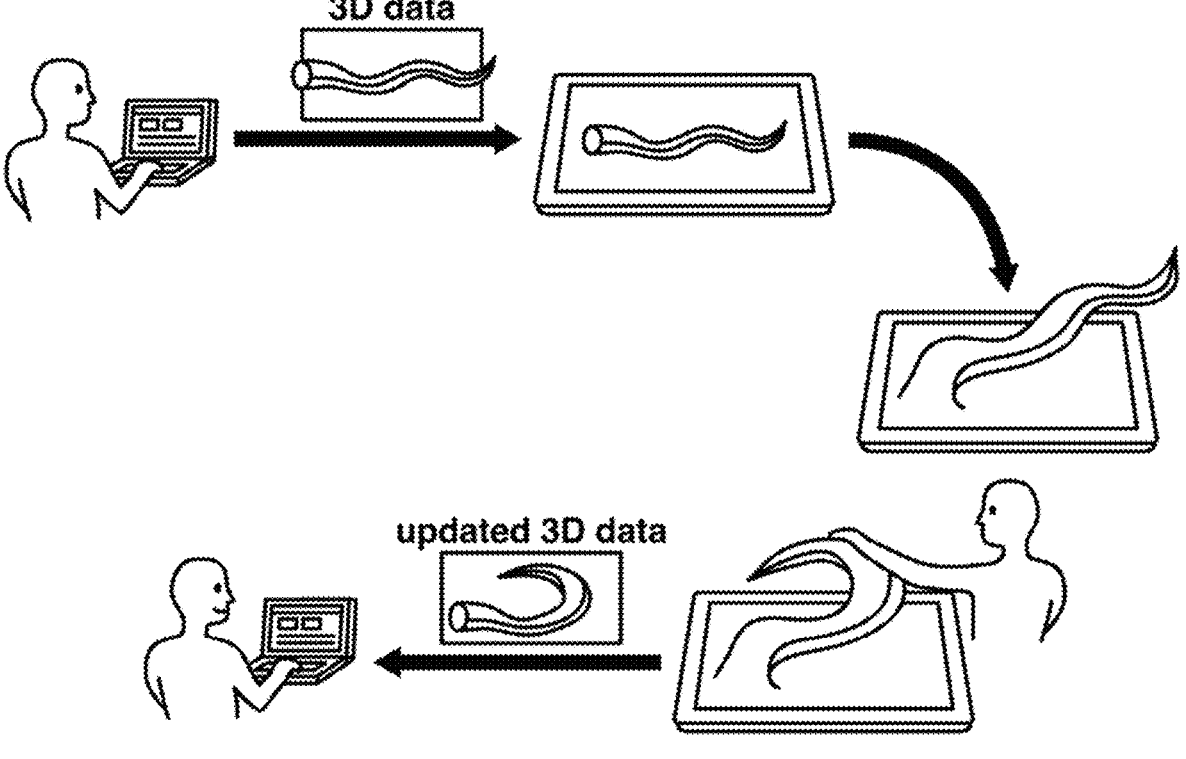
FIG. 7 is a flowchart of a user sending the data to the device then physically interacting with it.

It should be noted that the dynamics of the cylinders are programmable according to the desired output of those in the art and are capable of but not limited to rolling into Archimedean, Fibonaccian, and or Cartesian spirals. For more complex shape-creation (e.g. octopus leg as shown in FIGS. 5 and 7, etc.) the present invention device benefits from employing self-assembling magnetic lattices (in all entablements herein).

The spirals attach to each other through magnetic force or another force (e.g. rheological, shapeable ferrofluid: stretchability, smart fluid, magneto-rheological, electro-. rheological fluids (ERF), metamaterials, metafluids, air from small actuators, vacuums, pumps, etc.) induced by the electrical current. The orientation of each cylinder is modified or set by alterations of the electrical current. These alterations correspond to CED-transmitted data elements (e.g. pixel, color, color wavelength, etc.) Simultaneously, the other cylinders remain in their generally planar form to create other surfaces or features of representation.

The "deformable media" (i.e. the activatable, programmable rectangular sheets capable of becoming cylinders, and capable of returning to any resting plane which may be horizontal and flat or might maintain the last transmitted shape) will take the shape of the transmitted 3D object (e.g. human face, hand, animal paw, X-ray, CT scan, MRI, rainbow, sky, nature setting, etc.) meaning that the nanometer wavelength of each color (and each shade of color) of the visible light spectrum will be first be converted from 2D on the CED to 3D via the following techniques, algorithms, and frameworks (e.g. depth estimation with deep learning: DensePose, Monodepth2, MiDas (Multi-scale Dense Depth from Stereo) using TensorFlow or PyTorch; Multi-View Geometry (MVG): Structure from Motion (SfM), for their optimized low-memory usage and speed NeRF (Neural Radiance Fields) and COLMAP (Simultaneous Localization And Mapping) (preferable), open-source containing multi-view stereo (MVS) for 3D reconstruction; Depth from Stereo (SfS): Semi-Global Matching (SGM), OpenCV, etc.). The output of these algorithms (3D data) is then processed via force-aware motion planning algorithms (e.g. Probabilistic Roadmap Planning (PRM) with Contact Optimization, Trajectory Optimization, Kinodynamic Motion Planning (KMP) as well as force-unaware motion planning algorithms: A* search (for optimal path identification and slower processing time); (mRRT) for fast exploration of space in complex environments and when the optimal path isn't necessary; D* Lite for real-time replanning in dynamic environments.

For converting streaming media and streaming data from 2D-to-3D and then from 3D data-to-force-aware motion planning algorithms with depth estimation with deep learning (e.g densepose, monodepth2, midas) and multi-view geometry (MVG) (e.g. Structure from Motion (SfM) algorithms like COLMAP, etc.) and techniques known as background segmentation (e.g. DeepLabCut or Mask R-CNN) and temporal coherence algorithms (e.g. for motion estimation (3D reconstruction, video compression, video stabilization, etc.) including block matching algorithms (BMAs) (e.g. Full Search Block Matching (FSBM), Fast Search Algorithms, etc.); for optical flow coherence techniques like Lucas-Kanade method or Horn-Schunck algorithm; for frame prediction (e.g. Deep Learning-based Prediction, linear prediction, etc.); for Image/Video Denoising (Block-matching and 3D filtering, non-local means filtering); and for real-time rendering (e.g. object-space shading, visibility Culling, etc.)).

Figure 4:
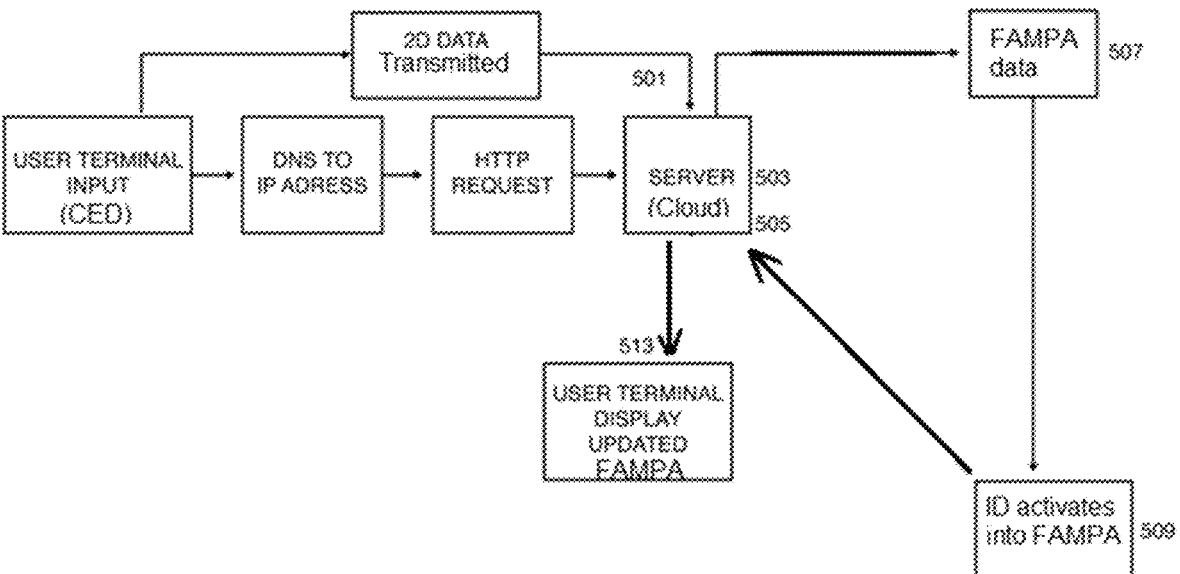
FIG. 4 is a flowchart of the preferred embodiment.

This processing is completed on either a software application on the CED (preferred) or software on the present invention Device. The final output being a series of lifts, bends, folds, and movement which results in the CED-transmitted data (e.g. image, text, etc.) (e.g. centimeters or inches of deformation (according to the specific applications of those in the art), such that the present invention Device represents for example, a rainbow via the same and or similar mechanisms as explained previously and as shown in FIGS. 2, 4 and 6. Put another way, the image includes respective color wavelengths (nm), voltage (amps) (converted to ionic conductivity (with the acknowledgement that as the ion concentration of the polymer used increases, so too will the conductivity) via an electrode) required to achieve coordinated lift/displacement based on the wavelength of the underlying pixel in the transmitted 3D data.

Further, the Dielectric Elastomer (preferable) or EASMP and PNIPAM deformable media shown in FIG. 14, FIG. 3 and FIG. 2 after receiving the stimulus (e.g. electric current and all other types of stimuli), manifest ionic conductivity that is electrical conductivity due to the motion of ionic charge, begin to roll up 201 on themselves 202 to form a plurality of cylinders, then stack as shown in FIGS. 202, 203, 204 at a corresponding length (e.g. 380-450 nm is the wavelength of the color purple; the media/device/present invention then converts from the transmitted 3D data the proportions of the 3D data that are purple (450 nm) and, entering the gamma phase pf EASMP and PNIPAM membranes as shown in FIG. 14, converts them to 0.45 cm or 0.45 inches according to the resolution, size, scope and sale of the applications being enacted by those in the art—by seeing the rainbow.

It is understood that the other colors of the rainbow would be converted according to a similar scale (e.g. Green: 500-570 nm would be manifest in stacked spirals of 0.5-0.7 cm or 0.5-0.7 inches, etc.). The current received by the EASMP and PNIPAM deformable media as shown in FIG. 14, or other polymer, ionogel, etc. is dispersed as shown in FIG. 8 in Siemens/cm here are: polyaniline, polypyrrole, polyacetylene, polyphenylene due to their high ionic conductivity.

This conductivity responds to the programmed and received electrical (or thermal) input. The electrical or thermal input is the force-aware motion planning algorithms previously described provide force-aware motion planning data and coordinates based on 3D data. The 3D data is received from the CED-transmitted 2D image and media, after that media is converted to 3D data. The force-aware motion planning output provides the present invention device with the programmed stimulus (e.g. specific amounts of energy-which are determined by the color wavelength (in nano-eters) of the 3D data-transmitted to specific surface areas of the rectangular cylinders) which results in lifts (in micrometers (preferably), centimeters or inches).

As shown in FIG. 8, the dispersed charge, when deactivated, removes the stimulus and thus the shape in the deformed media as the rectangular cylinders return to an at-rest position, which may or may not be a perfectly horizontal plane as previously discussed.

The disbursement of the charge corresponds to the lift/stress/strain required which is determined by the transmitted 3D data's color wavelengths as shown in FIGS. 5 and 7, meaning the higher the wavelength, the more charge/current/stimulus that surface area of the deformable media (e.g. the total amount of programmable rectangular cylinders) requires.

The EASMP and PNIPAM phases as shown in FIG. 14 provide an effective if non-technical/non-exact way to convey at-rest (alpha), deforming (beta), and activated (gamma) ways to convey a grid or network receiving different amounts of the charge, coming from a household outlet ((e.g. 80% of 15-amp and 20-amp, 120-volt circuits, issuing approximately. 1,800 watt hours).

It should be noted that polymers with nanostructured periodicity (i.e. the ability to create or reflect color) as discussed below are an essential and integral part of the present invention, readily a part of the present invention by those in the art, and in most applications of the present invention.

Integrating color change into deformable displays adds another layer of complexity. Here are some potential solutions:

Electrophoretic Displays (E Ink): These displays used in e-readers already offer bistable color changing. Research is ongoing to create flexible E Ink displays that could be integrated with deformable technologies.

Pigment Dispersion Films: These films contain pigments that can change color when an electrical field is applied. While still under development, they hold promise for flexible color-changing displays.

Photonic Crystals: These materials can control light propagation and reflection based on their structure. By manipulating the structure of photonic crystals integrated within deformable displays, color changes might be achieved.

While rectangular sheets are given as an example, other structures are contemplated to allow surfaces to form representation.

Figure 10:
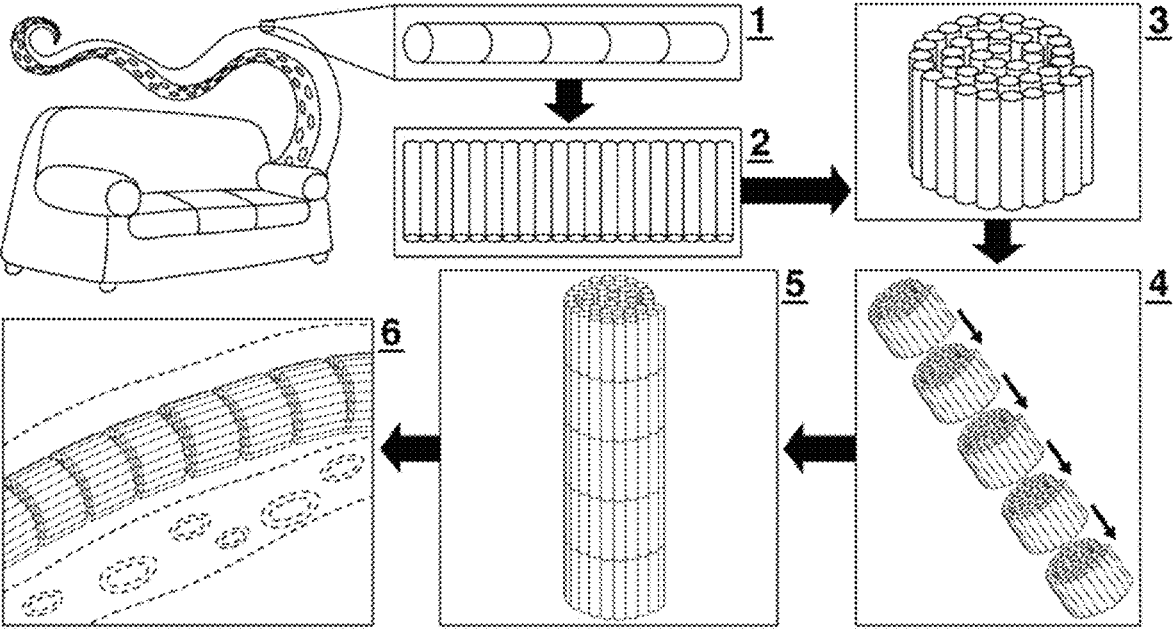
FIG. 10 is a presentation of the present invention wherein pins (e.g. carbon nanotubes (CNT), etc.) (instead of flat rectangles which convert into spirals when stimulated) are used as one method of embodiment of the present invention.
Figure 11:
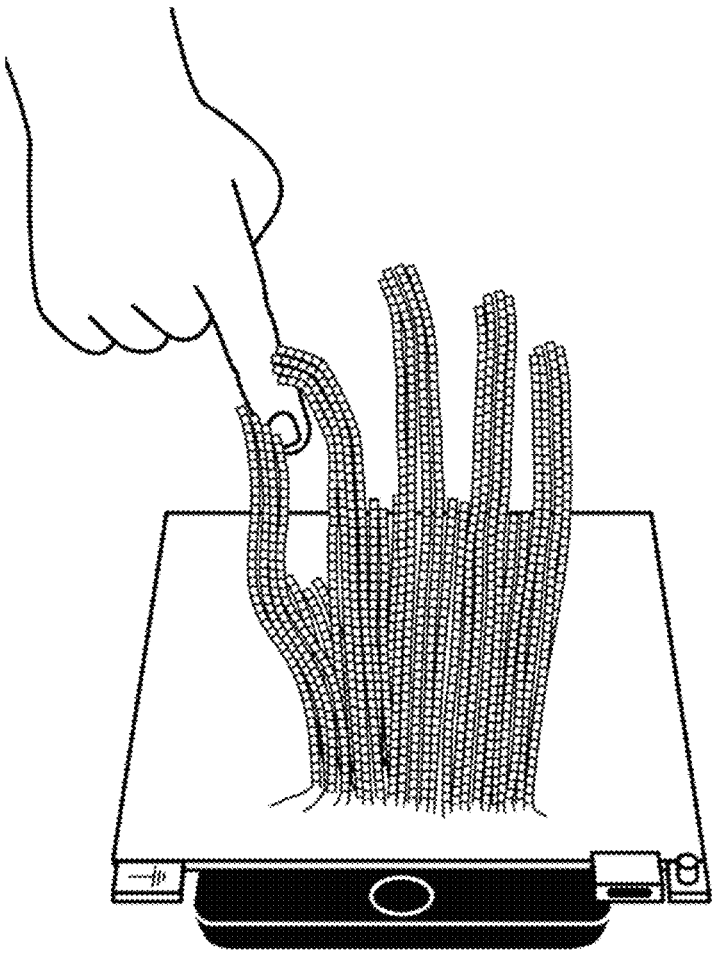
FIG. 11 is a presentation of the responsive architecture and one type of interaction of the interface with a human finger.
Figure 12:
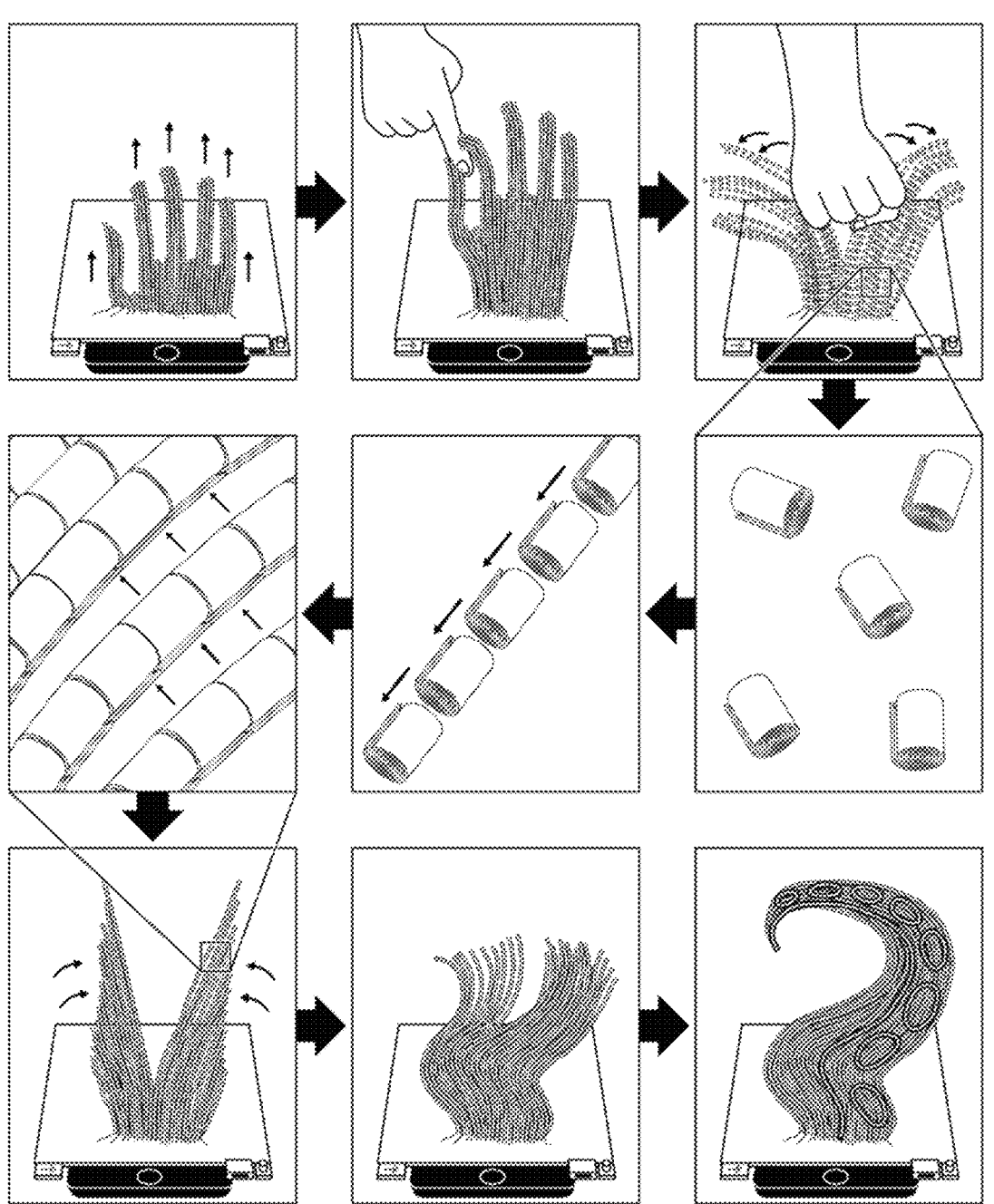
FIG. 12 is a presentation of the responsive architecture and healability of the interface with a human hand or fist, demonstrating morphability from a representation of a human hand into a representation of an octopus leg.

For example, individual rectangular cylinders s as shown in FIG. 10 are arranged in a matrix and their position modified by compressed air, electrical (or paraelectric, dielectric, triboelectric, piezoelectric, etc.) current or charge. Each rectangular cylinder has a surface attached at one end and along some portion of its shaft as shown in FIG. 10.

Figure 16:
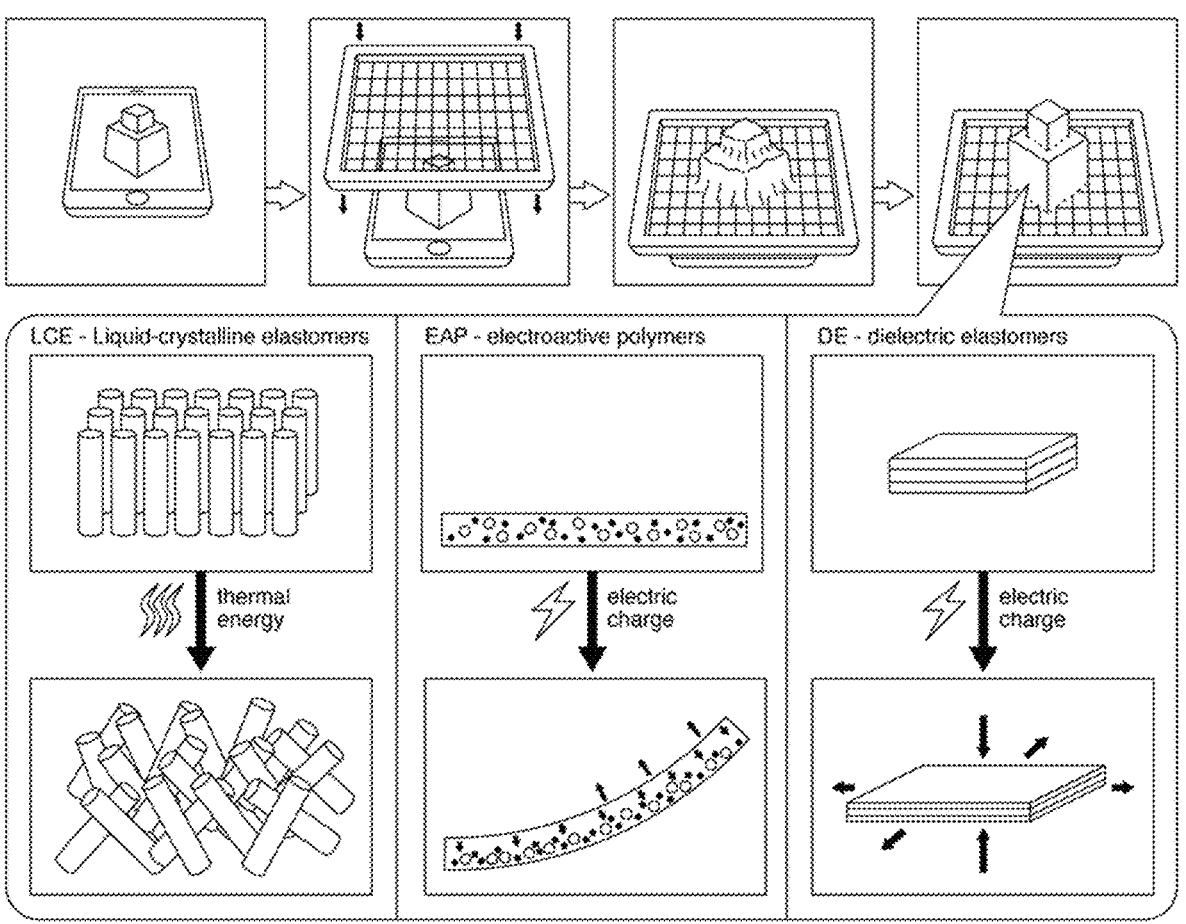
FIG. 16 is a presentation of a liquid crystalline elastomer (LCE), electroactive polymer (EAP), and dielectric elastomer (DE) enablement in which the cylinders below represent the rectangular sheets which roll into cylinders after activation.

In essence, the rectangular cylinder sheets are an example of a self-assembling magnetic lattice (SML), which is an optional component of enablement whether EASMPs and PNIPAM as shown in FIG. 14, LCE as shown in FIG. 16, or metamaterials are used. The SML's use will be modified based on the type of enablement selected with the note that SMLs are necessary for enablement for more complicated shape creation (e.g. healthcare and medical imaging, etc).

Figure 13:
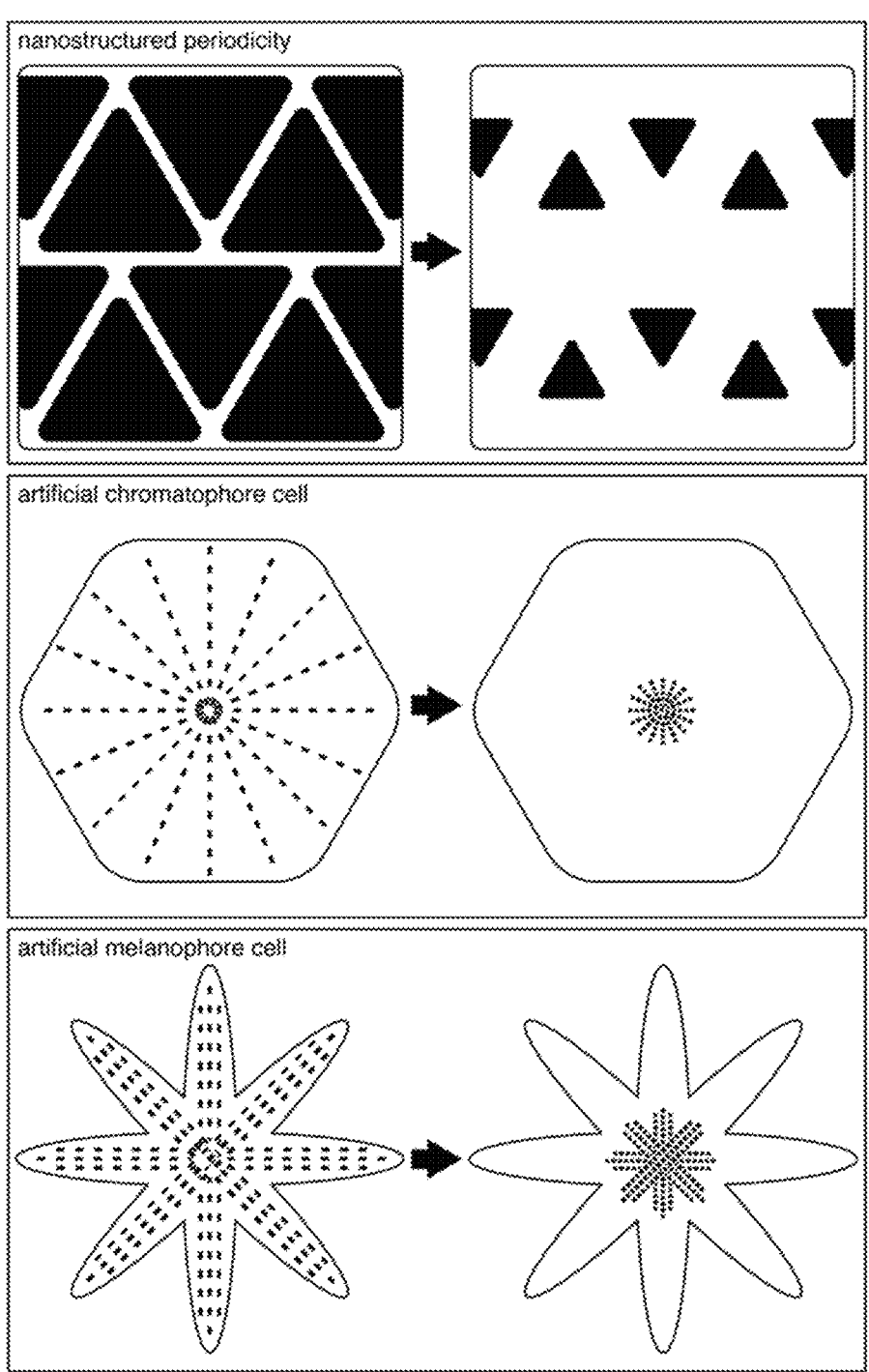
FIG. 13 is a presentation of nanostructured periodicity at the cell level as well as artificial chromatophore cells, and artificial melanophore cells.

Another optional component of enablement as shown in FIG. 13 includes a plurality of position-programmable, doped composite polymer rectangular cylinders with an added layer of color-changing cells. The present invention utilizes materials that can create color without pigments.

These materials achieve this by using tiny structures (nanostructures) to control how light interacts with the surface. Here are some examples:

Structured Coloration: Materials with nanostructures arranged in a specific way that reflects certain colors of light, like tiny diffraction gratings.

Artificial Chromatophores: Materials that mimic how some animals change color, using light-responsive nanostructures to control reflected colors.

Main-Chain Chiral Nematic Liquid Crystalline Elastomers (MCLCEs): A special type of stretchy material with a twisty internal structure that reflects certain colors of light.

Nanostructured Periodicity: Materials with repeating patterns of nanostructures that selectively reflect specific colors.

Surfaces are attached to position-programmable polymer rectangular cylinders and are moved into position thereby to create representation.

EASMPs and PNIPAM as shown in FIG. 14, then LCE's with EAP, and DE as shown in FIG. 16, then metamaterials are capable of basic to medium to highly sophisticated shape creation. Achieving high complexity often comes at the expense of self-healing or non-static properties.

Simpler designs with self-healing mechanisms or basic non-static functionalities are generally more achievable. Activation for metamaterial entablements is accomplished via (ultrasound, electrical signals (preferred), light, temperature, magnetic fields, mechanical stress, chemical signals, electromagnetic fields).

Those in the art have demonstrated that position-programmable polymer bodies (e.g. rectangular cylinders, etc.) have multiple pre-established forms (e.g. from basic geometries (cubes, spheres, cylinders, prisms, pyramids, etc.) up to and including:

Bioinspired Shapes with Limited Actuation:

Variable-Pitch Helical Spring: A self-healing metamaterial spring with a helical design. EAP elements allow for controlled changes in the spring's pitch (distance between coils), affecting its stiffness and potentially enabling limited expansion or contraction.

Variable-Aperture Petal: Inspired by flower petals, a self-healing metamaterial structure can mimic a petal shape. EAP actuation allows for controlled opening and closing of the "petal" to a limited extent.

Biomimetic Fin: A self-healing material fish. EAP elements enable limited bending or undulation of the fin for basic maneuvering.

Geometric Shapes with Reconfiguration:

Self-Healing Origami Cube with Hinges: A self-healing cube with pre-defined folds inspired by origami. EAP hinges allow for limited folding/unfolding motions along specific creases, potentially enabling reconfiguration between a cube and a more compact folded form.

Referring again to SMLs, a Reconfigurable Lattice Structure: A self-healing metamaterial with a pre-defined lattice structure. EAP elements allow for limited control over the spacing or orientation of the lattice elements, leading to slight changes in the overall shape or stiffness.

Curved Beam with Adjustable Curvature: A self-healing metamaterial beam with a pre-defined curved shape. EAP actuation enables some control over the curvature of the beam, allowing for limited adjustments to its overall form.

When electrical current is applied in the amount proportional to the desired yield as specified via the projection module, algorithms, and techniques, position-programmable polymer bodies (e.g. rectangular cylinders, etc.) transition from their current from into the form (i.e the CED-transmitted data that was converted into 3D data which was then converted into force-aware motion planning algorithmic output that corresponds to the applied current (based on the pixel and wavelength of the transmitted data).

The projection module uses force-aware motion planning algorithms as discussed previously (e.g. for entablements using actuators, bladders, pumps, springs, Hooke's Law and for entablements not using those components, force-aware motion planning algorithms (preferable) Are used) d to determine what the applied current needs to be per, where the applied current is a conversion to a three-dimensional object(s) of the transmitted data-stream object(s), said object(s) being data transmitted after being converted from 2D dimensionality to a 3D object per.

As the electric current adjusts the position-programmable polymer bodies to conform to the received electrical current. It is further contemplated that each position-programmable polymer body has unique pre-established forms. Likewise, the electrical current applied to each position-programmable polymer body is specific thereto as shown in FIG. 8 and that two or more position-programmable polymer bodies that are next to each other will not have the same electrical current applied to them—as directed by the transmitted 3D data which is shown in FIG. 5 after being received by the present invention warrants or receives a corresponding and correlated charge based on the color of the underlying pixels of the received 3D data as shown in FIG. 8.

For example, an alternative embodiment of the present invention uses an EASMP and PNIPAM membrane as shown in FIG. 14. Due to its non-solvent induced phased separation (NIPS) Polyvinylidene fluoride membrane (EASMP and PNIPAM membrane as shown in FIG. 14, hierarchical and otherwise) which generally: has reinforced hollow fiber which is able to withstand great pull pressure (up to 200 Newtons (N) or 45 pounds of force (lbf) or 20 kilograms-force (kgf)), is hydrophobic but can be made hydrophilic, has a Young's modulus/elastic modulus of 2.5 to 3.5 gigapascals 'GPa) and Poisson's ratio of 0.32 (which ratio decreases as the Zinc-Oxide (ZnO) content is increased)) 300 is an acceptable media to use.

It is anticipated and should be noted those in the art will be readily able and expected to use other materials (e.g. PZT (which contains lead), BNT-BT, perovskite and crystalline particularly LCD-, OLED- and MOLED-supporting/enabled applications, etc.) which that will meet their specific needs.

The present invention does not limit itself to specific materials. While traditional materials like EASMPs, PNIPAM membranes, LCE composites, and doped CPHs with the redundant healing process (RPH) as shown in FIG. 15 can achieve multiple level of healing (reference HEALING paragraph), the present invention allows for a broader range of materials with various properties, including:

Electromagnetic properties: Ferrofluidic properties (magnetism, electromagnetism), ferroelectric compositions (e.g., BaTiO3, KNbO3, PbTiO3, Pb (Zr, Ti) O3), perovskite and non-perovskite polymers.

Dielectric properties: A range of permittivity values across diverse temperature ranges, different degrees of frequency dispersion in the material's electrical characteristics (dielectric, triboelectric, magnetoelectric, etc.), high and low dielectric constants, minimal remnant polarization, wider or narrower hysteresis loops, and saturation polarization levels.

Piezoelectric properties: Notable electromechanical coupling and decoupling for applications using piezoelectricity (the piezoelectric effect).

Other considerations: Healability (degree of self-healing), responsiveness of the architecture, and conductivity (which can be tailored for specific needs).

Wide Range of Materials and Applications:

The present invention is not limited by a single material type. Different materials offer various levels of conductivity (e.g., Polyacetylene vs. Polytetrafluoroethylene). You can choose the material based on the desired response time and application (real-time vs. slower shape formation).

EXAMPLES

Fast, real-time response: Materials like Polyacetylene with high conductivity might be suitable for applications requiring near-instantaneous shape changes.

Figure 9:
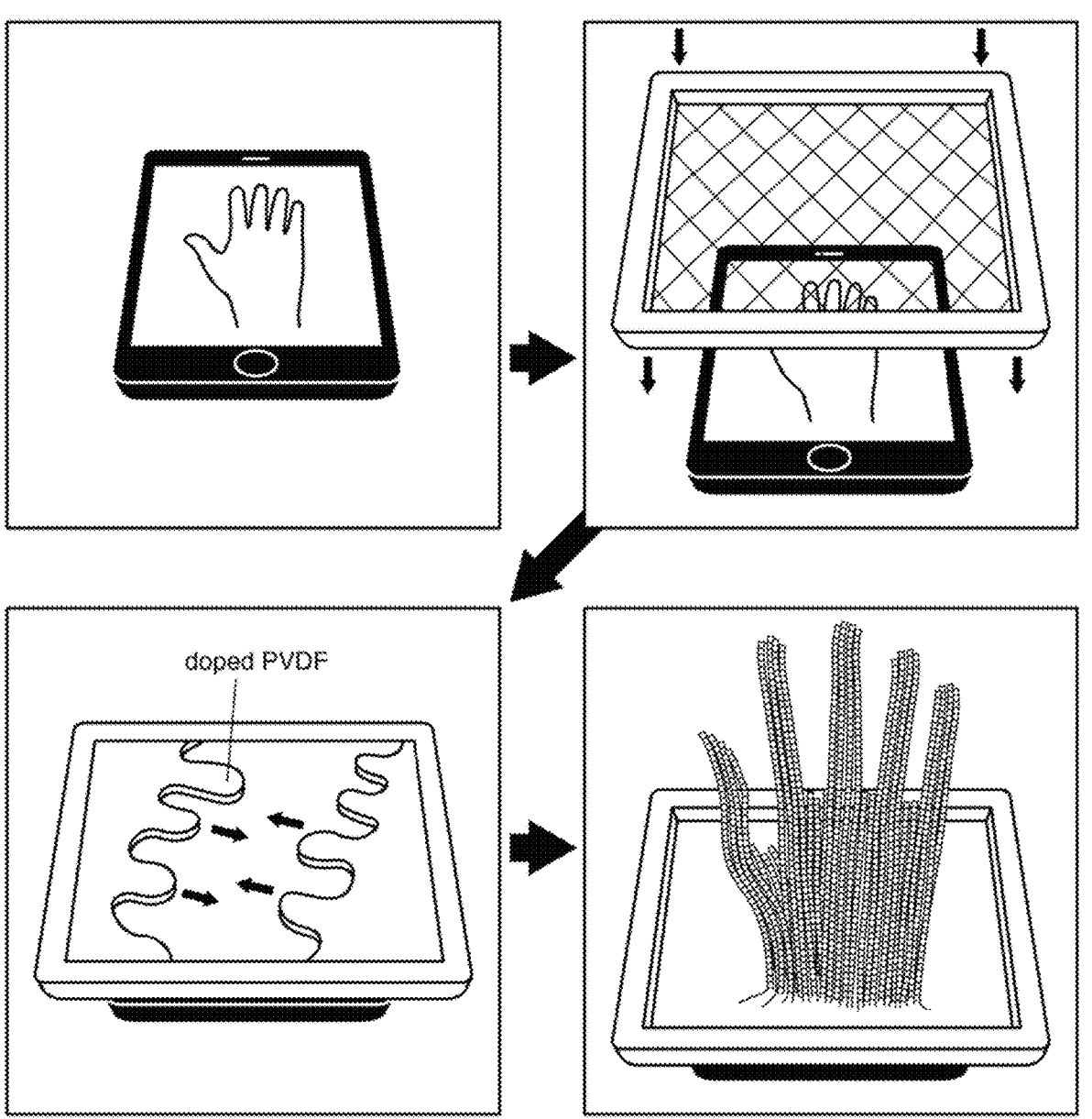
FIG. 9 is a presentation of the present invention functioning as an overlay on top of an existing device (e.g. smartphone, tablet, PC, etc.).

Slower, controlled shape formation: Materials with lower conductivity might be appropriate for applications like creating a static 3D model of a human face or hand as shown in FIG. 9 through a slower shaping process.

The present invention allows for a wide range of materials and customization options to achieve the desired responsive 3D objects with self-healing capabilities, morphability, and other functionalities for various applications.

When representation is established, contact therewith is monitored and received as input to either alter representation or data stream as shown in FIG. 5. Specifically users who touch the deformed media results in updates to the force-aware motion planning algorithms (FAMPA). The FAMPA then converts that data to 3D data in the cloud. Also in the cloud, the 3D data is then converted into 2D data which the user then receives on their CED.

For example, referring to FIG. 8, representation is a rainbow with corresponding color wavelengths and example voltage and deformation measurements. When a portion of the representation is contacted, interaction point 103 directs the invention device to alter the representation (e.g. update FAMPA) to allow the portion in the contacted form of the rainbow to relocate to another area of representation (e.g. different color due to different height, modified wavelength, modified power and deformation necessary) to allow the user to interact with the created shape, in this case a rainbow.

It should be understood that the present invention's process as shown in FIGS. 5 and 6 not only converts the data stream objects of any dimension to a self-healing, repeatably able to take the shapes of basic geometries as shown in FIG. 14 as well as other more complicated shapes (e.g. human face, human hand, octopus leg, etc.), return to a resting plane between different shape creations with each shape including a responsive architecture (e.g. SML, etc.). Levitation of not only the colors of the rainbow as shown in FIG. 8, an octopus or similar type of creature's leg as shown in FIGS. 5 and 7 or data points but of any portion of any transmitted data is clearly achievable.

For embodiments which create physical representations of data, charts, graphs, tables, etc. one method of such is by employing magnetic components or materials, the same will be adjusted according to the required outcomes sought. These characteristics in addition to those mentioned a but included in [0018] will also be covered by the present invention and are expected to be employed by those in the art.

Examples of materials that can be physically separated via magnetism from the main body of material include iron, nickel, cobalt, and their alloys, as well as ferrite, neodymium, and samarium cobalt magnets. Data points from charts, graphs, and tables show that these materials exhibit strong magnetic properties, with magnetic strengths ranging from 0.1-1.4 teslas (1000-14,000 Gauss) and pulling strengths up to 14.8 kilo-Gauss (KG). For example, some charts and data will be better physically represented by using, for example, neodymium (10.5-14.8 kG), Samarium Cobalt (8.5-11.0 kG), and ceramic (2.3-3.85 kG).

The types of magnetism employed will allow user interaction with the physically represented data (e.g. charts which capture stronger correlations between variables might use stronger magnetism and materials which contain stronger magnetic pull, etc.) The present invention encompasses various characteristics of magnetic components, in addition to those mentioned earlier, which are expected to be employed by those in the art. The use of magnetism is optional, and embodiments that employ magnetism require shielding of the control system components to prevent interference.

For embodiments that utilize magnetism, the characteristics include magnetic strength, magnetization direction, shape, size, and weight. Furthermore, the interaction and dynamics of these magnetic components with other components in various applications are also considered.

Further, input received via the shape-created representation is sent back to CED In this way representation functions as an input device to CED.

One unique feature of the present invention is that the interaction point 103 projects a physical representation of a data stream in three dimensions and in a separable and optionally magnetism-enabled fashion as discussed previously and that this representation is manipulable by the touch of a user.

Referring now to FIG. 5, a method of forming a representation on an interaction point 103 is depicted. Method 501 includes transmitting a data stream to an interaction point 103 501, interpreting the data stream into three-dimensional data/vectors 503, and determining electrical current amounts.

As show in FIG. 8, in particular the amps required per underlying pixel of the transmitted 3D data) to be sent to a plurality of surfaces as represented by 200, 201, 202 and FIG. 3 to effectuate the three-dimensional vectors 505, transmitting the determined electrical currents to the assigned surfaces 507, allowing the electrical current, after an electrode or similar device converts the voltage (e.g. 80% of 15-amp and 20-amp, 120-volt circuits, issuing apx. 1,800 watt hours) to ionic conductivity, to alter the physical form of the surfaces to create a representation 509, a user interacting with the representation created by the surfaces. See FIG. 7 which provides the process for a user interacting with the deformed media 511, and altering the representation through physical, acoustic/verbal, wifi, digital or other type of input (e.g. human-control interface (HCl), brain-control interface (BCI), etc.) 513.

The present invention will have immediate applications in photovoltaics, piezoelectric, clean energy/green energy, and nuclear energy applications (meaning radiation per [0018] is an anticipated means of enablement. Those in the art will readily be able to add photovoltaic properties to the deformable media. Therefore, the present invention covers all such use cases and applications.

The present invention includes an innovative sleeve-like skin product, designed to be placed on top of traditional consumer electronic devices (CEDs) such as tablets, laptops, and smartphone screens. This skin, made of lightweight and thin materials like doped polymers (e.g. doped EASMP and PNIPAM, as shown in FIG. 14), PA polymer, carbon nanotubes (CNT), etc., draws its power from the underlying device via a small cord is the process or method by which 2D data is converted to 3D data and by which 3D data is converted to FAMPA data.

With respect to the 2D to 3d to FAMPA to human interaction to updated FAMPA to 3D to 2D, in some cases people might just use 2D to FAMPA to updated FAMPA to 2D.

As illustrated in FIG. 14, the skin's material enables it to receive data from the device and convert it into responsive 3D physical objects. It is anticipated that users will plug their existing devices into the present invention or simply place the skin over their devices, enabling seamless transmission of data and creation of tangible representations. This innovative design enables the skin to tap into the device's capabilities, unlocking a new dimension of interactive possibilities.

Alternative Embodiment, Skin ID

The Skin ID is a wearable device made from a flexible OLED display or a DE material, combined with a Shape Memory Lattice (SML) and a Reverse Polymer Network (RPN). The SML's shape memory behavior can complement the DE material's elasticity and the RPN's adaptive structure, creating a robust and dynamic system that can stretch, deform, and recover its original shape. By integrating all three components, the material can exhibit a wider range of properties and behaviors, such as enhanced elasticity and deformability from the DE material, dynamic shape memory behavior from the SML, and adaptive structural support from the RPN. This hybrid material system can provide a more comprehensive and versatile solution for the skin ID's requirements, allowing it to conform to the user's body and display information in a flexible, interactive way. The skin enablement would be powered wirelessly and via USB-C, micro-USB, lightning connector (for Apple devices), etc.

The PDMS DE material replaces the glass in CED's accordingly:

Flexible OLED Display

Layer 1: Flexible plastic substrate (e.g. polyethylene terephthalate (PET) or polyimide (PI)).

Layer 2: Adhesion layer (e.g. silicon dioxide or titanium oxide).

Layer 3: Organic material layer (e.g. poly(3,4-ethylene-dioxythiophene) (PEDOT)).

Layer 4: Emissive layer (e.g. poly(phenylene vinylene) (PPV)).

Layer 5: Cathode layer (e.g. calcium or magnesium).

Layer 6: Encapsulation layer (e.g. silicon dioxide or magnesium oxide)

PDMS DE Display

Layer 1: PDMS substrate.

Layer 2: DE material (e.g. polyurethane or polydimethylsiloxane).

Layer 3: Electrode layer (e.g. carbon nanotubes or graphene).

Layer 4: Encapsulation layer (e.g. PDMS or silicon dioxide)

The exact layer structure may vary depending on the specific application and design requirements. In both cases, the layers are deposited or coated using various techniques, such as evaporation, sputtering, or spin-coating. The layers are then patterned and assembled to create the final display device.

Cloud-Based Conversion and Magnetic Shielding Integration:

Cloud Conversion: The Skin ID concept includes cloud-based processing for advanced functionalities. Here's the process flow:

2D/3D Data Input: Data (2D images, 3D images and models, and all other types of data) are uploaded to a cloud-based server.

FAMPA Data Conversion: The cloud server utilizes specialized software to convert the uploaded data into a format compatible with the Skin ID's display capabilities. This format is Force Aware Motion Planning Algorithms (FAMPA).

Skin Deformation: The FAMPA data is then transmitted wirelessly to the Skin ID. The DE material, SML, and RPN combination within the Skin ID deforms and reconfigures into the transmitted data based on the received data, visually representing the 2D image, 3D model, or other information.

Magnetic Shielding: For Skin ID applications that utilize magnetism for activation or interaction with the DE material, magnetic shielding becomes crucial for protecting the device's internal circuits (like those in the transmitting CED) from potential interference via:

Magnetic Shielding Material: A thin layer of a high-permeability material, such as Mu-metal, is integrated within the Skin ID's structure. This layer acts like a shield, absorbing and redirecting external magnetic fields away from the sensitive electronic components.

Strategic Placement: The magnetic shielding material is strategically placed around the areas (circuits) where the Skin ID interacts with magnetic fields, such as around the embedded magnets or sensors.

By incorporating these additional features, the Skin ID concept will grow beyond a device attached to CED's to become a versatile platform for interacting with and visualizing various types of data.

Alternative Embodiment, Movie Theatre ID

The movie theatre ID is a large-scale device which enhances the cinematic experience. Made from a DE material, a Shape Memory Lattice (SML), a Reverse Polymer Network (RPN) and using single-walled carbon nanotubes (SWCNTs) to support up to 50 feet deformations, inflations and shape taking of objects from the movie (characters, objects, etc.).

Carbon Nanotubes (CNTs) and Carbon Fibers are materials with exceptional mechanical properties. Single-Walled CNTs (SWCNTs) have a strength up to 63 GPa, Young's Modulus up to 1 TPa, and a strength-to-weight ratio up to 1,300,000 kN·m/kg, with excellent fatigue resistance. Multi-Walled CNTs (MWCNTs) have a strength up to 30 GPa, Young's Modulus up to 0.5 TPa, and a strength-to-weight ratio up to 600,000 kN·m/kg, with good fatigue resistance (80% probability). Ultra-High Modulus (UHM) Carbon Fibers have a strength up to 10 GPa, Young's Modulus up to 700 GPa, and a strength-to-weight ratio up to 450,000 kN·m/kg, with excellent fatigue resistance (90% probability). High-Modulus (HM) Carbon Fibers have a strength up to 7 GPa, Young's Modulus up to 500 GPa, and a strength-to-weight ratio up to 350,000 kN·m/kg, with good fatigue resistance (75% probability).

Specific examples of Movie Theatre ID-function capable single-walled carbon nanotubes (SWCNTs) include (n,m) configurations like (6,5), (7,3), and (8,0). These SWCNTs, essentially rolled-up single layers of graphene (as depicted in FIG. 3), have diameters ranging from 0.75 nm to 0.94 nm and are known for their chirality, high electrical conductivity and carrier mobility. These materials can be further functionalized or modified with various chemical groups to enhance their properties and solubility. The Movie Theatre ID design considers the SWCNTs' anisotropic properties and direction of loading.

The Movie Theatre ID can stretch and deform to match the shapes of elements in the movie, creating an immersive experience for the audience. The SML's shape memory behavior complements the DE material's elasticity, the SWCNT's functionality and the RPN's adaptive structure, creating a robust and dynamic system that can stretch, deform, and recover its original shape. By integrating all four components, the material can exhibit a wider range of properties and behaviors, such as enhanced elasticity and deformability from the DE material, dynamic shape memory behavior from the SML, physical human interaction due to the SWCNT's and adaptive structural support from the RPN. This Movie Theatre ID provides a more comprehensive and versatile solution for the movie theatre ID's requirements, allowing it to stretch up to 50 feet while maintaining its structural integrity.

Breakdown of the Movie Theatre ID components with specific examples, layering, and safety features:

Layering: Support Structure: A sturdy steel frame or truss system forms the core support structure for the Movie Theatre ID.

High-Strength Mesh: Material: High-tensile strength polyester mesh. This provides a strong, breathable base that allows for some controlled movement and flexibility. Imagine a large, high-quality projector screen material with a slightly thicker and more robust weave.

Shape Memory Alloy (SMA) Integration: Thin wires or threads made from a Nickel-Titanium (Ni-Ti) SMA alloy is be woven into specific sections of the mesh. These sections are strategically placed to create subtle movements or vibrations that enhance the movie experience without compromising safety. For example, SMA threads is be woven into the ceiling to create a rippling effect during a spaceship takeoff scene.

Safety Padding: Material: High-density, flame-retardant polyurethane foam with a soft, flexible outer layer made of a breathable cotton fabric. This padding absorbs impact and provides a comfortable touch experience for the audience. Imagine a fire-resistant padding similar to what's used in gymnastic mats, covered with a soft, breathable fabric like cotton.

DE Material Accents with RPN: Placement: Small, strategically placed sections of DE material with a Reverse Polymer Network (RPN) structure is be integrated onto specific areas of the safety padding. This allows for localized, controlled interaction with the movie content. A section of DE material is be embedded within the safety padding where movie characters and objects extend to the audience.

Properties: The DE material in these sections is specifically designed to mimic the texture and appearance of movie characters and objects. This involves pigmentation technology to match the color and a surface texture created using microscopic patterns or imprints. Imagine a thin, flexible layer that feels slightly rubbery and textured, replicating the look and feel of an alien finger. The RPN structure enhances the DE material's durability and ability to maintain its shape after interaction.

SWCNT's ((6,5), (7,3), and (8,0)) as discussed.

Sensor Network: Type: A network of pressure and proximity sensors is embedded within the fabric mesh, particularly near the DE material accents. These sensors detect human touch or proximity, triggering specific effects.

Safety Features: Software Control: The Movie Theatre ID's movement is controlled by pre-programmed software (e.g. 2D to 3D to FAMPA to human interaction to updated FAMPA to 3D to 2D as well as 2D to FAMPA to human interaction to updated FAMPA to 2D depending on the desired resolution, latency, streaming time, pixelation, etc.) that defines the range and speed of motion for the fabric mesh and underlying support structure. This ensures everything remains within safe boundaries.

Physical Constraints: Anchoring: The fabric mesh is securely anchored to the support structure at multiple points with adjustable tension. This limits overall movement and ensures the mesh supported by SWCNTs remains taut.

DE Material Accent Size and Placement: The size and placement of the DE material accents is carefully considered to minimize the risk of entanglement or injury.

Emergency Override System: Activation: A clearly marked emergency stop button is readily accessible to theater personnel. Additionally, the system is programmed with a redundant automatic shutoff protocols triggered by sensor abnormalities, excessive movement, or power outages.

Additional Considerations: Hygiene: The DE material accents, padding surfaces, and sensor network is treated with antimicrobial coatings to prevent the spread of germs. Temperature Control: A ventilation system (breathable holes within the Movie Theatre ID composite are integrated within the support structure to maintain a comfortable temperature within the theater.

Alternative Embodiment, Stylus

The ID Stylus is a versatile tool that enables users to interact with, direct, guide, and shape the ID only in rare cases and environments where human interaction at room temperature is not safe nor possible (e.g. nuclear energy environments, high-pressure environments (deep sea environments), sharp or corrosive materials, biohazardous materials, space exploration). With its precise tip, the stylus is used to trace patterns, draw shapes, and create complex designs on the ID's surface. The stylus also activates the ID using various methods, such as magnetism, chemical signals, thermal changes, ultrasound waves, or UV light. For example, the stylus contains a small magnet that activates the ID's shape-memory behavior when brought close, and a thermal tip that heats up to trigger the ID's change in shape. The stylus can also be designed to turn off the ID when not in use, providing a convenient and safe way to control the ID's behavior. With its advanced capabilities, the ID Stylus unlocks new possibilities for interacting with and controlling IDs in various applications.

Additional Considerations:

In these scenarios, the stylus would be the primary tool for interacting with the ID due to the reasons outlined previously (safe distance, activation methods, precise control).

ID Material: The specific limitations would depend on the ID material and its properties. For instance, a flexible DE material might require the stylus in more situations compared to a rigid, more durable material.

Activation Methods: The choice of activation method for the stylus (magnetism, chemical signals, thermal, etc.) depends on the ID's technology and the specific environment.

By using the stylus in conjunction with the ID, users can safely interact with information and control the device even in environments where direct human touch is not possible.

Thus, it is appreciated that the optimum dimensional relationships for the parts of the present invention, to include variation in size, materials, shape, form, function, and manner of operation, assembly, and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the present invention should be determined by the appended claims and their legal equivalents, rather than by the examples given.

The embodiments of the invention in which an exclusive property or privilege is claimed are defined as follows:

1. A shape-changing interface system, comprising:
an interaction point with a plurality of surfaces made from a programmable shape-changing material;
a projection module that interprets data and communicates with the surfaces;
a computing device for transmitting and receiving data streams to the interaction point;
wherein the data stream controls the shape-changing material to form a 3D representation of the data;
wherein contacting the 3D shape transmits information back to the computing device;
when representation is established, contact therewith is monitored and received as input to either alter the representation or data stream;
contact results in updates to one or more force-aware motion planning algorithms (FAMPA);
the FAMPA converts that data to 3D data in the cloud; and
the 3D data is then converted into 2D data which the user then receives on their CED.

2. The system of claim 1, wherein
a skin is made of doped polymers, PA polymer, or carbon nanotubes;
the skin draws its power from the underlying device via a small cord; and
the skin converts 2D data to 3D data and 3D data is converted to FAMPA data.

3. The system of claim 1, integrated with medical imaging software, allowing for the creation of 3D models from medical scans.

4. The system of claim 1, with detachable surfaces are combined to create larger and more complex 3D structures.

5. The system of claim 1, comprising self-healing properties within the shape-changing material, allowing it to recover from minor tears or deformations.

6. A method for controlling a shape-changing interface, comprising:

receiving a data stream containing information about a desired 3D shape;

interpreting the data and generating control signals for the shape-changing material;

transmitting the control signals to the interaction point surfaces, causing them to morph into the desired 3D form;

including a feedback loop where sensor data from the interaction point refines the 3D representation; and is adaptable for real-time data visualization, where the 3D shape dynamically changes based on a live data feed.

7. The method of claim 6, adaptable for real-time data visualization, where the 3D shape dynamically changes based on a live data feed.

8. A shape-changing material composition for the interface, comprising:

a base polymer matrix with shape memory capabilities or responsive to electrical fields or light; and conductive elements embedded within the matrix for receiving electrical signals; and self-healing properties achieved through the use of bio-compatible materials and self-repair mechanisms.

9. The composition of claim 8, wherein the self-healing process further comprises a redundant healing process (RHP);

the composition including EASMP and PNIPAM deformable media; and the healing processes harness the properties of EASMP and PNIPAM to achieve comprehensive healing.

10. The composition of claim 8, wherein

PNIPAM enables self-healing through reversible hydrophobic interactions, reforming its polymer chains upon cooling; and simultaneously, the dynamic covalent bonds within EASMP enable it to self-heal through reversible cross-linking, reforming its network structure.

* * * * *